(12) United States Patent
Beckerman et al.

(10) Patent No.: US 10,975,841 B2
(45) Date of Patent: Apr. 13, 2021

(54) COMPUTER SYSTEM AND METHOD FOR DETECTING ROTOR IMBALANCE AT A WIND TURBINE

(71) Applicant: Uptake Technologies, Inc., Chicago, IL (US)

(72) Inventors: Bernard McAlpine Beckerman, Chicago, IL (US); Benedict Augustine, Arlington Heights, IL (US); Matthew George Dzugan, Forest Park, IL (US)

(73) Assignee: Uptake Technologies, Inc., Chicago, IL (US)

( * ) Notice: Subject to any disclaimer, the term of this patent is extended or adjusted under 35 U.S.C. 154(b) by 58 days.

(21) Appl. No.: 16/530,535

(22) Filed: Aug. 2, 2019

(65) Prior Publication Data

US 2021/0033066 A1 Feb. 4, 2021

(51) Int. Cl.
*F03D 7/02* (2006.01)
*F03D 7/04* (2006.01)
*F03D 17/00* (2016.01)

(52) U.S. Cl.
CPC ........... *F03D 7/0276* (2013.01); *F03D 7/028* (2013.01); *F03D 7/048* (2013.01); *F03D 17/00* (2016.05); *F05B 2270/1014* (2013.01)

(58) Field of Classification Search
CPC ........ F03D 7/0276; F03D 7/028; F03D 7/048; F03D 17/00; F05B 2270/1014
(Continued)

(56) References Cited

U.S. PATENT DOCUMENTS 4,420,692 A * 12/1983 Kos .................. F03D 7/0224
                                                            290/44
4,435,647 A *  3/1984 Harner ................. F03D 7/043
                                                            290/44
(Continued)

FOREIGN PATENT DOCUMENTS

CN       107191339 A    9/2017
GB         2405492 A    3/2005
(Continued)

OTHER PUBLICATIONS

Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015]. Retrieved from the Internet <URL:https://repository.lib.ncsu.edu/bitstream/handle/1840.16/9313/etd.pdf?sequence=2&isAllowed=y>.
(Continued)

*Primary Examiner* — Pedro J Cuevas
(74) *Attorney, Agent, or Firm* — Lee Sullivan Shea & Smith LLP

(57) ABSTRACT

In examples, a computing system is configured to detect rotor imbalance at wind turbines by (1) obtaining sets of historical-vibration data for turbines, each set comprising vibration data captured by a given turbine's multi-dimensional sensor, (2) deriving a rotor-imbalance-detection model by: (a) for each turbine, (i) transforming time segments of the turbine's historical-vibration dataset into a frequency-domain representation, and (ii) for each time segment, using the frequency-domain representation for the time segment to derive a set of harmonic-mode values for at least one frequency-range of interest, thereby deriving a time-series set of harmonic-mode values for the turbine, and (b) performing an evaluation of the time-series sets for the turbines, thereby deriving the rotor-imbalance-detection
(Continued)

model, (3) based on received vibration data for a given turbine from a reference time, executing the derived model, thereby detecting a rotor imbalance at the given turbine, and (4) transmitting a notification of the rotor imbalance.

20 Claims, 10 Drawing Sheets

(58) Field of Classification Search
USPC .......................................... 290/44, 55; 416/1
See application file for complete search history.

(56) References Cited

U.S. PATENT DOCUMENTS

| | | | |
|---|---|---|---|
| 5,140,856 A | 8/1992 | Larsen | |
| 5,566,092 A | 10/1996 | Wang et al. | |
| 5,633,800 A | 5/1997 | Bankert et al. | |
| 6,256,594 B1 | 7/2001 | Yamamoto et al. | |
| 6,336,065 B1 | 1/2002 | Gibson et al. | |
| 6,442,542 B1 | 8/2002 | Ramani et al. | |
| 6,473,659 B1 | 10/2002 | Shah et al. | |
| 6,525,518 B1* | 2/2003 | Garnaes | F03D 7/0296 324/76.13 |
| 6,622,264 B1 | 9/2003 | Bliley et al. | |
| 6,634,000 B1 | 10/2003 | Jammu et al. | |
| 6,643,600 B2 | 11/2003 | Yanosik et al. | |
| 6,650,949 B1 | 11/2003 | Fera et al. | |
| 6,725,398 B1 | 4/2004 | Varma et al. | |
| 6,760,631 B1 | 7/2004 | Berkowitz et al. | |
| 6,775,641 B2 | 8/2004 | Wegerich et al. | |
| 6,799,154 B1 | 9/2004 | Aragones et al. | |
| 6,823,253 B2 | 11/2004 | Brunell | |
| 6,859,739 B2 | 2/2005 | Wegerich et al. | |
| 6,892,163 B1 | 5/2005 | Herzog et al. | |
| 6,947,797 B2 | 9/2005 | Dean et al. | |
| 6,952,662 B2 | 10/2005 | Wegerich et al. | |
| 6,957,172 B2 | 10/2005 | Wegerich | |
| 6,975,962 B2 | 12/2005 | Wegerich et al. | |
| 7,020,595 B1 | 3/2006 | Adibhatla et al. | |
| 7,082,379 B1 | 7/2006 | Bickford et al. | |
| 7,100,084 B2 | 8/2006 | Unkle et al. | |
| 7,107,491 B2 | 9/2006 | Graichen et al. | |
| 7,127,371 B2 | 10/2006 | Duckert et al. | |
| 7,233,886 B2 | 6/2007 | Wegerich et al. | |
| 7,280,941 B2 | 10/2007 | Bonanni et al. | |
| 7,308,385 B2 | 12/2007 | Wegerich et al. | |
| 7,373,283 B2 | 5/2008 | Herzog et al. | |
| 7,400,055 B2* | 7/2008 | Nagao | F03D 7/0296 290/44 |
| 7,403,869 B2 | 7/2008 | Wegerich et al. | |
| 7,409,320 B2 | 8/2008 | Wegerich | |
| 7,415,382 B1 | 8/2008 | Bickford et al. | |
| 7,428,478 B2 | 9/2008 | Aragones | |
| 7,447,666 B2 | 11/2008 | Wang | |
| 7,457,693 B2 | 11/2008 | Olsen et al. | |
| 7,457,732 B2 | 11/2008 | Aragones et al. | |
| 7,509,235 B2 | 3/2009 | Bonissone et al. | |
| 7,536,364 B2 | 5/2009 | Subbu et al. | |
| 7,539,597 B2 | 5/2009 | Wegerich et al. | |
| 7,548,830 B2 | 6/2009 | Goebel et al. | |
| 7,634,384 B2 | 12/2009 | Eryurek et al. | |
| 7,640,145 B2 | 12/2009 | Wegerich et al. | |
| 7,660,705 B1 | 2/2010 | Meek et al. | |
| 7,692,322 B2* | 4/2010 | Wakasa | F03D 7/0296 290/44 |
| 7,725,293 B2 | 5/2010 | Bonissone et al. | |
| 7,739,096 B2 | 6/2010 | Wegerich et al. | |
| 7,756,678 B2 | 7/2010 | Bonissone et al. | |
| 7,822,578 B2 | 10/2010 | Kasztenny et al. | |
| 7,869,908 B2 | 1/2011 | Walker | |
| 7,919,940 B2 | 4/2011 | Miller et al. | |
| 7,941,701 B2 | 5/2011 | Wegerich et al. | |
| 7,962,240 B2 | 6/2011 | Morrison et al. | |
| 8,024,069 B2 | 9/2011 | Miller et al. | |
| 8,026,623 B2* | 9/2011 | Wakasa | F03D 7/0296 290/44 |
| 8,050,800 B2 | 11/2011 | Miller et al. | |
| 8,115,331 B2* | 2/2012 | Wakasa | F03D 7/0296 290/44 |
| 8,145,578 B2 | 3/2012 | Pershing et al. | |
| 8,186,949 B2* | 5/2012 | Nielsen | F03D 9/25 416/9 |
| 8,229,769 B1 | 7/2012 | Hopkins | |
| 8,234,420 B2 | 7/2012 | Lueckenbach et al. | |
| 8,239,170 B2 | 8/2012 | Wegerich | |
| 8,261,599 B2* | 9/2012 | Jeffrey | G01H 1/006 73/66 |
| 8,275,577 B2 | 9/2012 | Herzog | |
| 8,285,402 B2 | 10/2012 | Lueckenbach et al. | |
| 8,299,643 B2* | 10/2012 | Wakasa | F03D 7/0296 290/44 |
| 8,311,774 B2 | 11/2012 | Hines | |
| 8,321,194 B2 | 11/2012 | Meagher et al. | |
| 8,352,216 B2 | 1/2013 | Subbu et al. | |
| 8,395,273 B2* | 3/2013 | Wakasa | F03D 7/043 290/44 |
| 8,532,795 B2 | 9/2013 | Adavi et al. | |
| 8,533,018 B2 | 9/2013 | Miwa et al. | |
| 8,546,968 B2* | 10/2013 | Wakasa | F03D 7/0296 290/44 |
| 8,560,494 B1 | 10/2013 | Downing et al. | |
| 8,606,418 B1 | 12/2013 | Myers et al. | |
| 8,620,618 B2 | 12/2013 | Eryurek et al. | |
| 8,620,853 B2 | 12/2013 | Herzog | |
| 8,626,385 B2 | 1/2014 | Humphrey | |
| 8,645,276 B2 | 2/2014 | Wong et al. | |
| 8,660,980 B2 | 2/2014 | Herzog | |
| 8,689,108 B1 | 4/2014 | Duffield et al. | |
| 8,713,467 B1 | 4/2014 | Goldenberg et al. | |
| 8,786,605 B1 | 7/2014 | Curtis et al. | |
| 8,799,799 B1 | 8/2014 | Cervelli et al. | |
| 8,812,960 B1 | 8/2014 | Sun et al. | |
| 8,832,594 B1 | 9/2014 | Thompson et al. | |
| 8,850,000 B2 | 9/2014 | Collins et al. | |
| 8,862,938 B2 | 10/2014 | Souvannarath | |
| 8,868,537 B1 | 10/2014 | Colgrove et al. | |
| 8,886,601 B1 | 11/2014 | Landau et al. | |
| 8,909,656 B2 | 12/2014 | Kumar et al. | |
| 8,917,274 B2 | 12/2014 | Ma et al. | |
| 8,918,246 B2 | 12/2014 | Friend | |
| 8,924,429 B1 | 12/2014 | Fisher et al. | |
| 8,935,201 B1 | 1/2015 | Fisher et al. | |
| 8,937,619 B2 | 1/2015 | Sharma et al. | |
| 8,938,686 B1 | 1/2015 | Erenrich et al. | |
| 9,347,431 B2* | 5/2016 | Esbensen | F03D 7/0204 |
| 9,360,393 B2* | 6/2016 | Poon | F03D 17/00 |
| 9,587,629 B2* | 3/2017 | Deshpande | F03D 7/0224 |
| 9,897,073 B2* | 2/2018 | Moerbe | F03D 7/0296 |
| 10,180,997 B2 | 1/2019 | Kim et al. | |
| 10,480,486 B2* | 11/2019 | Brodsgaard | F03D 7/0224 |
| 10,527,520 B2* | 1/2020 | Poon | F03D 17/00 |
| 10,669,986 B2* | 6/2020 | Kristoffersen | F03D 7/0296 |
| 10,781,795 B2* | 9/2020 | Gbadamassi | F03D 17/00 |
| 2002/0091972 A1 | 7/2002 | Harris et al. | |
| 2002/0152056 A1 | 10/2002 | Herzog et al. | |
| 2003/0055666 A1 | 3/2003 | Roddy et al. | |
| 2003/0126258 A1 | 7/2003 | Conkright et al. | |
| 2004/0181712 A1 | 9/2004 | Taniguchi et al. | |
| 2004/0230377 A1 | 11/2004 | Ghosh et al. | |
| 2004/0243636 A1 | 12/2004 | Hasiewicz et al. | |
| 2005/0119905 A1 | 6/2005 | Wong et al. | |
| 2005/0222747 A1 | 10/2005 | Vhora et al. | |
| 2006/0033338 A1* | 2/2006 | Wilson | F03D 13/20 290/44 |
| 2006/0066111 A1* | 3/2006 | Suryanarayanan | F03D 7/0272 290/44 |
| 2007/0263628 A1 | 11/2007 | Axelsson et al. | |
| 2008/0059080 A1 | 3/2008 | Greiner et al. | |
| 2008/0059120 A1 | 3/2008 | Xiao et al. | |
| 2008/0067815 A1* | 3/2008 | Suryanarayanan | F03D 7/0296 290/44 |

(56) References Cited

U.S. PATENT DOCUMENTS

| | | | |
|---|---|---|---|
| 2008/0206051 A1* | 8/2008 | Wakasa | F03D 9/25 416/41 |
| 2008/0260514 A1* | 10/2008 | Nielsen | F03D 7/044 415/4.3 |
| 2009/0263245 A1* | 10/2009 | Shi | F03D 7/02 416/43 |
| 2009/0266160 A1* | 10/2009 | Jeffrey | F03D 13/35 73/455 |
| 2009/0292397 A1* | 11/2009 | Bjerge | F03D 7/0272 700/280 |
| 2010/0111693 A1* | 5/2010 | Wilson | F03D 7/0296 416/1 |
| 2010/0274400 A1 | 10/2010 | Ormel et al. | |
| 2011/0020122 A1 | 1/2011 | Parthasarathy et al. | |
| 2011/0101691 A1 | 5/2011 | Hashimoto et al. | |
| 2011/0204636 A1* | 8/2011 | Scholte-Wassink | F03D 7/042 290/44 |
| 2012/0053984 A1 | 3/2012 | Manner et al. | |
| 2012/0139240 A1* | 6/2012 | Otamendi Claramunt | F03D 7/043 290/44 |
| 2012/0139740 A1* | 6/2012 | Drossel | F03D 17/00 340/658 |
| 2012/0183399 A1* | 7/2012 | Perkinson | F03D 17/00 416/1 |
| 2012/0185180 A1 | 7/2012 | Frederiksen | |
| 2012/0209539 A1 | 8/2012 | Kim | |
| 2012/0271612 A1 | 10/2012 | Barsoum et al. | |
| 2012/0310597 A1 | 12/2012 | Uchiyama et al. | |
| 2013/0010610 A1 | 1/2013 | Karthikeyan et al. | |
| 2013/0024416 A1 | 1/2013 | Herzog | |
| 2013/0283773 A1 | 10/2013 | Hague | |
| 2013/0287567 A1* | 10/2013 | Olesen | F03D 7/0288 416/1 |
| 2013/0294911 A1* | 11/2013 | Egedal | F03D 7/024 416/1 |
| 2013/0325502 A1 | 12/2013 | Robicsek et al. | |
| 2014/0012886 A1 | 1/2014 | Downing et al. | |
| 2014/0032132 A1 | 1/2014 | Stratton et al. | |
| 2014/0060030 A1 | 3/2014 | Ma et al. | |
| 2014/0088887 A1* | 3/2014 | Poon | G01M 13/00 702/34 |
| 2014/0088888 A1* | 3/2014 | Poon | F03D 80/50 702/34 |
| 2014/0089035 A1 | 3/2014 | Jericho et al. | |
| 2014/0105481 A1 | 4/2014 | Hasselbusch et al. | |
| 2014/0116124 A1* | 5/2014 | Ma | G05B 23/0232 73/112.01 |
| 2014/0121868 A1 | 5/2014 | Zhang et al. | |
| 2014/0169398 A1 | 6/2014 | Arndt et al. | |
| 2014/0170617 A1 | 6/2014 | Johnson et al. | |
| 2014/0184643 A1 | 7/2014 | Friend | |
| 2014/0222355 A1 | 8/2014 | Cheim et al. | |
| 2014/0324495 A1 | 10/2014 | Zhou et al. | |
| 2014/0330600 A1 | 11/2014 | Candas et al. | |
| 2014/0330749 A1 | 11/2014 | Candas et al. | |
| 2014/0351642 A1 | 11/2014 | Bates et al. | |
| 2014/0357295 A1 | 12/2014 | Skomra et al. | |
| 2014/0358601 A1 | 12/2014 | Smiley et al. | |
| 2014/0365187 A1 | 12/2014 | Guzman et al. | |
| 2015/0046870 A1 | 2/2015 | Goldenberg et al. | |
| 2015/0085297 A1 | 3/2015 | Hughes et al. | |
| 2015/0262060 A1 | 9/2015 | Husain et al. | |
| 2015/0345476 A1 | 12/2015 | Gregg et al. | |
| 2016/0033580 A1 | 2/2016 | Qiao et al. | |
| 2016/0034856 A1 | 2/2016 | Son | |
| 2016/0115941 A1* | 4/2016 | Marwaha | F03D 17/00 416/1 |
| 2016/0153427 A1* | 6/2016 | Bunge | F03D 13/35 416/1 |
| 2016/0169205 A1 | 6/2016 | Wang et al. | |
| 2016/0222946 A1* | 8/2016 | Krings | G01P 15/04 |
| 2017/0234300 A1* | 8/2017 | Brodsgaard | F03D 7/0224 416/1 |
| 2017/0241404 A1* | 8/2017 | Kristoffersen | F03D 7/042 |
| 2017/0335827 A1 | 11/2017 | Wilson et al. | |
| 2017/0350789 A1* | 12/2017 | Poon | G01M 13/00 |
| 2018/0010576 A1 | 1/2018 | Brake et al. | |
| 2018/0058425 A1 | 3/2018 | Deshpande et al. | |
| 2018/0142676 A1 | 5/2018 | Pedersen | |
| 2018/0245568 A1* | 8/2018 | Pedersen | G01M 7/00 |
| 2018/0347542 A1* | 12/2018 | Tomas | F03D 17/00 |
| 2019/0145381 A1* | 5/2019 | Gbadamassi | F03D 13/35 73/455 |
| 2020/0125978 A1* | 4/2020 | Abbaszadeh | G06N 7/005 |
| 2020/0340450 A1* | 10/2020 | Grunnet | F03D 7/045 |
| 2020/0363282 A1* | 11/2020 | Imbert | G01M 1/22 |

FOREIGN PATENT DOCUMENTS

| | | |
|---|---|---|
| KR | 20160073945 A | 6/2016 |
| WO | 2011117570 | 9/2011 |
| WO | 2013034420 | 3/2013 |
| WO | 2014145977 | 9/2014 |
| WO | 2014205497 | 12/2014 |
| WO | 2017194067 A1 | 11/2017 |

OTHER PUBLICATIONS

Isermann, Rolf. Model-based Fault Detection and Diagnosis—Status and Applications. Institute of Automatic Control, Darmstadt University of Technology, Darmstadt, Germany, Jun. 2004, pp. 1-12.[online], [retrieved on Oct. 8, 2015]. Retrieved from the Internet <URL: http://citeseerx.ist.psu.edu/viewdoc/download?doi=10.1.1.113.9295&rep=rep1&type=pdf>.

Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <URL:https://ti.arc.nasa.gov/publications/2266/download/>.

Prentzas et al. Categorizing Approaches Combining Rule-Based and Case-Based Reasoning. Expert Systems 24, Apr. 17, 2007, pp. 1-34 [online], [retrieved on Oct. 8, 2015]. Retrieved from the Internet <URL:http://citeseerx.ist.psu.edu/viewdoc/download?doi=10.1.1.143.2780&rep=rep1&type=pdf>.

Infor M3 Enterprise Management System. Datasheet [online]. Infor, 2014 [retrieved May 19, 2015]. Retrieved from the Internet: <URL:www.infor.com.html>.

Infor Equipment. Datasheet [online]. Infor, 2012 [retrieved May 19, 2015]. Retrieved from the Internet:<URL:www.infor.com.html>.

Infor Introduces Next-Generation Solution for Equipment Dealers and Service Providers. Infor, Feb. 2014 pp. 1-5. [online], [retrieved May 19, 2015]. Retrieved from the Internet:<URL:www.infor.com/company/news/pressroom/pressreleases/M3equipment.html>.

Infor Equipment for Rental. Datasheet [online] Infor, 2013 [retrieved May 19, 2015]. Retrieved from the Internet:<URL:www.infor.com.html>.

Waltermire et al. Applying the Continuous Monitoring Technical Reference Model to the Asset, Configuration, and Vulnerability Management Domains (DRAFT). National Institute of Standards and Technology, U.S. Department of Commerce, Jan. 2012, pp. 1-23 [online], [retrieved Oct. 6, 2015]. Retrieved from the Internet: URL<https://csrc.nist.gov/CSRC/media/Publications/nistir/7800/draft/documents/Draft-NISTIR-7800.pdf.

F.P. Garcia Marquez et al. Condition Monitoring of Wind Turbines: Techniques and Methods. Renewable Energy: An International Journal, Apr. 5, 2012, pp. 169-178 [online], [retrieved on Mar. 25, 2019]. Retrieved from the Internet <URL:https://www.sciencedirect.com/science/article/pii/S0960148112001899>.

Yamamoto et al. A Smart Experimental Setup for Vibration Measurement and Imbalance Fault Detection in Rotating Machinery. Case Studies in Mechanical Systems and Signal Processing, Jul. 30, 2016, pp. 12 [online], [retrieved on Mar. 25, 2019]. Retrieved from the Internet <URL:https://www.sciencedirect.com/science/article/pii/S2351988616300185.

(56) References Cited

OTHER PUBLICATIONS

Z. Daneshi-Far et al., Review of Failures and Condition Monitoring in Wind Turbine Generators, XIX International Conference on Electrical Machines—ICEM 2010, Rome, 1-6. (Year:2010).

Jan Nelsen et al., Long Term Monitoring of Wind Farms Using Big Data Approach, 2016 IEEE Second International Conference on Big Data Computing Service and Application, 265-268, (Year: 2016).

Can Huang et al., Maximum Power Point Tracking Strategy for Large-Scale Wind Generation Systems Considering Wind Turbine Dynamics, IEEE Transactions on Industrial Electronics, vol. 62, No. 4, Apr. 2015, 2530-2539. (Year: 2015).

Muhammad Khalid and Andrey V. Savkin, A Method for Short-Term Wind Power Prediction With Multiple Observation Points, IEEE Transactions on Power Systems, vol. 27, No. 2, May 2012, 579-586. (Year: 2012).

\* cited by examiner

COMPUTER SYSTEM AND METHOD FOR DETECTING ROTOR IMBALANCE AT A WIND TURBINE

BACKGROUND

In recent years, there has been a focus on utilizing renewable energy sources to help reduce reliance on fossil fuels. One example renewable energy source is a wind turbine that converts wind's kinetic energy into electricity. Broadly speaking, a wind turbine is an asset that utilizes multiple subsystems to help accomplish this conversion. Typically, a wind site (also known as a "wind farm" or "wind park"), which includes numerous wind turbines, is arranged at a geographical location that experiences windy conditions and provides electricity to an existing power grid.

Because of the increasing reliance on wind turbines to generate renewable energy, it is also becoming increasingly desirable to monitor and analyze wind turbines in operation. To facilitate this, some have developed mechanisms to monitor wind turbine attributes and detect abnormalities at a wind turbine.

Overview

A typical wind turbine includes a nacelle that sits atop the wind turbine's tower and houses the main components of the turbine's drivetrain including a drive shaft, gearbox, generator, brake assembly, etc. The drive shaft is coupled to a rotor that includes a hub to which two or more blades are attached and a pitch system that controls the blades' pitch angles. When wind passes over a turbine's blades, the blades and rotor rotate driving the drive shaft, which results in the wind turbine generating electricity. Thus, the physical characteristics of each blade and operating state of the overall rotor typically have a direct impact on a wind turbine's performance.

However, in practice, a wind turbine can experience rotor imbalance, such as when one of the wind turbine's blades has an irregularity relative to the other blades (e.g., mass distribution and/or shape irregularities), when problems exist with the turbine's pitch system, and/or when rotor couplings cause a blade to behave irregularly, among other possibilities. In turn, rotor imbalance may lead to several negative consequences for a wind turbine.

For example, rotor imbalance at a wind turbine may ultimately lead to structural problems at the wind turbine that require additional maintenance and/or decrease the overall lifetime of the wind turbine. As another example, rotor imbalance at a wind turbine may reduce the turbine's productivity/efficiency (e.g., in terms of how much energy the wind turbine is able to capture from the wind). Rotor imbalance at a wind turbine may lead to other negative consequences as well.

In an effort to avoid (or at least minimize) rotor imbalance, the blades of a new wind turbine are typically selected such that the physical characteristics of the blades (e.g., mass distribution and shape) closely match one another. However, because the blades of a wind turbine are typically handmade, it can be difficult to select multiple (e.g., three or more) blades that sufficiently match one another such that the blades do not cause rotor imbalance. Further, the physical characteristics of one or more of the wind turbine's blades can be unintentionally altered while the blades are being transported to the site of the wind turbine and/or can change over time as the wind turbine is operating (e.g., due to weather conditions or the like), any of which may introduce a physical irregularity at one blade relative to the other blades that in turn causes rotor imbalance.

In view of the foregoing, there is a need for technology that is capable of detecting a rotor imbalance at a wind turbine, so that the rotor imbalance can be remedied and the negative consequences described above can be avoided. However, existing technology for detecting a rotor imbalance at a wind turbine has significant drawbacks. For instance, some current approaches involve using a camera to capture footage of a wind turbine's rotor and/or individual blades and then reviewing the captured footage for evidence of rotor imbalance. Some other current approaches involve retrofitting a wind turbine with specialized sensors (e.g., "strain gauge" sensors, acoustic emission sensors, etc.) after the wind turbine has been assembled at a wind site and then evaluating measurements of these specialized sensors as a means of detecting rotor imbalance. There are additional current approaches as well. However, current approaches are time consuming, costly, prone to error, and reliant on post-assembly installation of specialized sensors and/or other equipment.

To help address these and other problems, the present disclosure is directed to an improved technological process for detecting rotor imbalance at a wind turbine (e.g., a horizontal-axis wind turbine) using vibration data captured by a wind turbine's preinstalled multi-dimensional sensor, either alone or in combination with other data related to the operation of the wind turbine (e.g., other operating data, vibration data from one or more of the wind turbine's other preinstalled sensors, weather data, etc.). At a high level, the disclosed process may involve (i) a "training" phase during which a model for detecting rotor imbalance (e.g., a predictive model or a set of rules) is derived based on historical vibration data for wind turbines and perhaps other data related to the operation of the wind turbine as well (e.g., other types of historical operating data, historical environmental data, historical maintenance data, etc.), and (ii) an "alerting" phase during which the defined model is applied to vibration data for wind turbines (and perhaps other data) from a reference time to determine whether any wind turbine appears to have rotor imbalance. Each of these phases is described in further detail below.

In practice, a data analytics platform may be configured to monitor and/or analyze the operation of wind turbines in a real-world environment (e.g., a set of wind turbines at a given wind site). In example embodiments, when a given wind turbine is originally assembled at a wind site, the wind turbine is equipped with sensors that facilitate monitoring certain aspects of the wind turbine's operation. A subset of these sensors (e.g., a subset of 6 sensors) may be dedicated to measuring vibrations occurring at the wind turbine's drive shaft, gearbox, generator, etc., and this set may include at least one multi-dimensional sensor (e.g., a biaxial sensor) installed in or proximate to the turbine's nacelle. Notably, however, these sensors are not dedicated to monitoring or detecting rotor imbalance.

As mentioned above, in one possible implementation of the "training" phase of the process for detecting rotor imbalance disclosed herein, a data analytics platform may be configured to analyze respective sets of historical time-series vibration data for a plurality of wind turbines and use that as a basis to derive a model for detecting rotor imbalance. For instance, the data analytics platform may receive respective sets of historical time-series vibration data captured by multi-dimensional sensors at a plurality of wind turbines, where each wind turbine's historical time-series vibration data may be indicative of vibrations at the wind turbine in multiple different dimensions (e.g., side-to-side vibrations corresponding to an x-dimension and fore-to-aft vibrations corresponding to a y-dimension). In operation, this historical time-series vibration data may take a variety of forms, such as a time-series of periodic "bursts" of vibration data captured at a high sample rate (e.g., 500-second windows of vibration data that includes 100 samples per second).

During the "training" phase, the data analytics platform may be configured to optionally filter each wind turbine's respective set of historical vibration data to exclude vibration data corresponding to times when the wind turbine may have been operating abnormally for a reason other than rotor imbalance. In other words, the data analytics platform may be configured to preprocess the data so that it derives the model based on historical vibration data that corresponds to the "normal" operation of the set of wind turbines. To that end, the data analytics platform may filter the respective sets of historical vibration data based on a variety of other data related to the historical operation of the plurality of wind turbines, such as other types of operating data (e.g., historical energy production data) and/or environmental data (e.g., historical weather data for the wind site).

Next, for each wind turbine, the data analytics platform may be configured to break the wind turbine's respective set of historical time-series vibration data into a plurality of time segments, convert each respective time segment into the frequency domain, and then aggregate frequency-domain values for each respective time segment within one or more frequency-ranges of interest. This function may take various forms.

As one possible implementation of this function, the data analytics platform may take each respective "burst" within the historical time-series vibration data for a given wind turbine and then perform a Fourier transform of the particular "burst" in each dimension measured by the given wind turbine's multi-dimensional sensor (e.g., fore-to-aft and side-to-side). This function results in a representation of the particular "burst" in the frequency domain (for each dimension) that includes a set of peaks spaced out at different frequency ranges corresponding to different "harmonic modes" (e.g., integer multiples of the given wind turbine's rotor frequency, such as 1P, 3P, etc.). Once in the frequency domain, the data analytics platform may apply a statistical aggregation (e.g., averaging, identifying the median value, etc.) to the Fourier coefficient values of the particular "burst" within each respective frequency range and for each dimension to derive a set of "harmonic mode" values for the particular "burst" (e.g., a $1P_x$ value, $3P_x$ value, etc. for the side-to-side dimension and a $1P_y$ value, $3P_y$ value, etc. for the fore-to-aft dimension).

Carrying out the foregoing function for each respective "burst" within a given wind turbine's historical time-series vibration data may result in a time-series set of "harmonic mode" values for the given wind turbine, where each respective time point in the time-series set of "harmonic mode" values comprises a multivariate vector that includes the derived set of "harmonic mode" values for the respective "burst" associated with that time point. Viewed another way, this function may result in multiple, different time-series sets for the given wind turbine that each correspond to a particular type of "harmonic mode" value, such as a first time-series set of $1P_x$ values, a second time-series set of $1P_y$ values, a third time-series set of $3P_x$ values, a fourth time-series set of $3P_y$ values, etc.

In some implementations, after deriving a set of "harmonic mode" values for each respective "burst" within a given wind turbine's historical time-series vibration data and thereby producing a time-series set of "harmonic mode" values for the given wind turbine, the data analytics platform may also perform a temporal "roll-up" operation on the time-series set of "harmonic mode" values for the given wind turbine, which may help reduce noise across the "bursts." This function may take various forms.

As one possible implementation of this function, the data analytics platform may perform a temporal "roll-up" operation on the time-series set of "harmonic mode" values for the given wind turbine using a lookback window approach, which involves performing the following operations for each of a plurality of reference time points in the time-series set of "harmonic mode" values: (i) obtaining the "harmonic mode" values for time points within a predetermined window of time preceding the reference time point (e.g., a two-week lookback window), (ii) applying a statistical aggregation (e.g., averaging, identifying the median value, etc.) to the obtained "harmonic mode" values for the time points within the predetermined window of time preceding the reference time point as well as the "harmonic mode" values for the reference time point, and (iii) assigning the resulting, rolled-up "harmonic mode" values to the reference time point (e.g., a rolled-up $1P_x$ value, $1P_y$ value, $3P_x$ value, $3P_y$ value, etc.). Carrying out these operations for each of a plurality of reference time points in the time-series set of "harmonic mode" values for a given wind turbine may then result in a rolled-up, time-series set of "harmonic mode" values for the given wind turbine, which may then be used to derive the model for detecting rotor imbalance. Other types and manners of performing a temporal "roll-up" are also possible.

Next, the data analytics platform may be configured to evaluate the respective time-series sets of "harmonic mode" values for the plurality of wind turbines (either as initially derived or in rolled-up form) and thereby derive a model for determining whether a wind turbine's "harmonic mode" values are indicative of a rotor imbalance issue. In this respect, it is expected that the "harmonic mode" values at or near the rotor frequency (e.g., the $1P_x$ and $1P_y$ values) for the wind turbines will be most indicative of whether the turbines have a rotor imbalance issue, but it is possible that other "harmonic mode" values may be correlated to rotor imbalance as well. In practice, the model for detecting rotor imbalance may take a variety of forms, and the data analytics platform may derive this model in a variety of manners.

As one possibility, the model for detecting rotor imbalance may take the form of a predictive model that is configured to (i) receive one or more sets of "harmonic mode" values that have been derived based on multi-dimensional vibration data captured at a given wind turbine and (ii) output an indication of whether the given wind turbine is predicted to have a rotor imbalance issue. In this respect, the data analytics platform may derive such a predictive model by applying a machine-learning technique (e.g., logistic regression, support vector machine, random forest, neural network, etc.) to training data that includes time-series sets of "harmonic mode" values for a plurality of wind turbines (perhaps in rolled-up form) that have been derived in the manner described above, perhaps along with labels indicating times when the plurality of wind turbines were known to have a rotor imbalance issue.

As another possibility, the model for detecting rotor imbalance may take the form of a predictive model that is configured to (i) receive one or more sets of "harmonic mode" values that have been derived based on multi-dimensional vibration data captured at a given wind turbine along with other types of data related to the operation of the given wind turbine (e.g., rotor frequency, windspeed, ambient temperature, etc.) and (ii) output an indication of whether the given wind turbine is predicted to have a rotor imbalance issue. In this respect, the data analytics platform may derive such a predictive model by applying a machine-learning technique (e.g., logistic regression, support vector machine, random forest, neural network, etc.) to training data that includes time-series sets of "harmonic mode" values for a plurality of wind turbines (perhaps in rolled-up form) that have been derived in the manner described above and historical data related to the operation of the plurality of wind turbines, perhaps along with labels indicating times when the plurality of wind turbines were known to have a rotor imbalance issue.

As yet another possibility, the model for detecting rotor imbalance may take the form of a rules-based model that is configured to (i) receive one or more sets of "harmonic mode" values that have been derived based on multi-dimensional vibration data captured at a given wind turbine and perhaps also historical data related to the operation of the given wind turbine (e.g., rotor frequency, windspeed, ambient temperature, etc.) and (ii) output an indication of whether a rotor imbalance issue has been detected at the given wind turbine. In this respect, the data analytics platform may derive such a rules-based model by identifying values or ranges of values (and/or other features indicative of rotor behavior) corresponding to wind turbines exhibiting "balanced" rotor behavior and then in turn identifying one or more deviations from these values or ranges of values (and/or other features) that correspond to wind turbines exhibiting a rotor imbalance issue, which may then be embodied into a set of rules that comprises the rules-based model for detecting rotor imbalance. For instance, one possible example of a rules-based model may be configured to detect a rotor imbalance at a given wind turbine when the average value of its "harmonic mode" values for a given rotor frequency (e.g., its $1P_x$ and $1P_y$ values) over one week exceeds a first threshold or the standard deviation over two weeks exceeds a second threshold. Other manners of deriving a rules-based model for detecting rotor imbalance also exist.

After the data analytics platform derives a model for determining whether wind-turbine multi-dimensional vibration data is indicative of a rotor imbalance issue, the data analytics platform is configured to proceed to an "alerting" phase during which the data analytics platform generally determines whether vibration data from a given wind turbine for a particular reference time (i.e., "reference vibration data") is indicative of a rotor imbalance issue at the turbine.

More specifically, in one possible implementation of the "alerting" phase of the process for detecting rotor imbalance disclosed herein, a data analytics platform may be configured to receive vibration data from a given wind turbine from a reference time. For instance, the data analytics platform may receive reference time-series vibration data captured by a multi-dimensional sensor at a given wind turbine that is indicative of fore-to-aft vibrations and side-to-side vibrations at the given wind turbine. In operation, this reference vibration data may take a variety of forms, such as a time-series set of one or more "bursts" of vibration data captured at a high sample rate (e.g., 500-second windows of vibration data that includes 100 samples per second), which may be the same or a different sample rate used during the "training" phase. In operation, the data analytics platform may receive this reference vibration data in real-time, near real-time, or otherwise shortly after the turbine's multi-dimensional sensor captures the data.

During the "alerting" phase, the data analytics platform may be configured to optionally filter the given wind turbine's reference time-series vibration data to exclude vibration data corresponding to times when the given wind turbine may have been operating abnormally (or the data analytics platform may decline to execute the "alerting" phase altogether). To that end, the data analytics platform may perform this function based on a variety of other data related to the operation of the given wind turbine, such as other operating data (e.g., current and/or most recent energy production data) and/or environmental data (e.g., current and/or most recent weather data for the given wind turbine's wind site). In example implementations, this optional function may be included only when a comparable function was included during the "training" phase, while in other implementations, this optional function may be included or excluded regardless of whether a comparable function was included or excluded during the "training" phase.

Next, the data analytics platform may be configured to break the wind turbine's reference time-series vibration data into a plurality of time segments (in instances when the received vibration data spans multiple time segments), convert each respective time segment into the frequency domain, and then aggregate frequency-domain values for each respective time segment within one or more frequency-ranges of interest. This function may take various forms.

As one possible implementation of this function, the data analytics platform may take one or more "bursts" within the given wind turbine's reference time-series vibration data and then perform a Fourier transform to each "burst" in each dimension measured by the given wind turbine's multi-dimensional sensor (e.g., fore-to-aft and side-to-side). As in the "training" phase, this function results in a representation of the particular "burst" in the frequency domain (for each dimension) that includes a set of peaks spaced out at different frequency ranges corresponding to different "harmonic modes." Once in the frequency domain, the data analytics platform may apply a statistical aggregation (which may be the same or different from the function used during the "training" phase) to the Fourier coefficient values of the particular "burst" within each respective frequency range and for each dimension to derive a set of "harmonic mode" values for the particular "burst" (e.g., a $1P_x$ value, $3P_x$ value, etc. for the side-to-side dimension and a $1P_y$ value, $3P_y$ value, etc. for the fore-to-aft dimension).

Carrying out the foregoing function for at least one "burst" within the given wind turbine's reference time-series vibration data may result in at least one corresponding set of "harmonic mode" values for the given wind turbine at a respective time point, where the respective time point comprises a multivariate vector that includes the derived set of "harmonic mode" values for the at least one "burst" associated with that time point. In some implementations, after deriving the at least one set of "harmonic mode" values, the data analytics platform may also perform a temporal "roll-up" operation as discussed before with respect to the "training" phase but using previously-derived sets of "harmonic mode" values for "bursts" from reference vibration data that preceded the at least one "burst" in time.

In any case, the data analytics platform may be configured to execute the model defined in the "training" phase using the at least one set of "harmonic mode" values (either as initially derived or in rolled-up form) that was derived based on the given wind turbine's reference time-series vibration data, which results in an indication of whether the given wind turbine's multi-dimensional vibration data is indicative of a rotor imbalance issue. As noted above, in some implementations, executing the model for detecting rotor imbalance may take into account both (i) one or more sets of "harmonic mode" values derived based on the given wind turbine's reference time-series vibration data and (ii) other data that may be indicative of a rotor imbalance issue, such as other operating data for the given wind turbine, environmental data for the given wind turbine, and/or other data derived therefrom.

If the model outputs an indication that there does appear to be a rotor imbalance issue at the given wind turbine, the data analytics platform may generate an output (e.g., an alert or other notification) and provide the output to an individual responsible for overseeing the operation of the given wind turbine, such as by presenting a representation of an alert at a work station, mobile device, or the like. In some cases, the data analytics platform may be configured to perform various other functions as a result of executing the model for detecting rotor imbalance as well.

Accordingly, in one aspect, disclosed herein is a method for detecting rotor imbalance at a wind turbine that involves (1) obtaining respective sets of historical vibration data for each of a plurality of wind turbines, wherein each respective set of historical vibration data comprises vibration data captured by a multi-dimensional sensor of a respective wind turbine, (2) based on the respective sets of historical vibration data, deriving a model for detecting rotor imbalance by: (a) for each respective wind turbine of the plurality of wind turbines, (i) transforming each of a plurality of time segments of the respective wind turbine's set of historical vibration data into a respective frequency domain representation, and (ii) for each respective time segment of the plurality of time segments, using the respective frequency domain representation of the historical vibration data for the respective time segment to derive a respective set of harmonic mode values for at least one frequency range of interest within the respective frequency domain representation, wherein the respective sets of harmonic mode values for the plurality of time segments of the respective wind turbine's set of historical vibration data collectively comprise a respective time-series set of harmonic mode values for the respective wind turbine, and (b) performing an evaluation of the respective time-series sets of harmonic mode values for the plurality of wind turbines and thereby deriving the model for detecting rotor imbalance, (3) receiving a given set of vibration data for a given wind turbine from a given reference time, (4) based on the given set of vibration data, executing the derived model for detecting rotor imbalance and thereby detecting a rotor imbalance at the given wind turbine, and (5) after detecting the rotor imbalance at the given wind turbine, transmitting, to an output device via a data network, a notification of the rotor imbalance at the given wind turbine.

In another aspect, disclosed herein is a computing system comprising a network interface, at least one processor, a non-transitory computer-readable medium, and program instructions stored on the non-transitory computer-readable medium that are executable by the at least one processor to cause the computing system to carry out the functions disclosed herein associated with detecting rotor imbalance at a wind turbine.

In yet another aspect, disclosed herein is a non-transitory computer-readable medium having instructions stored thereon that are executable by at least one processor to cause a computing system to carry out the functions disclosed herein associated with detecting rotor imbalance at a wind turbine.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
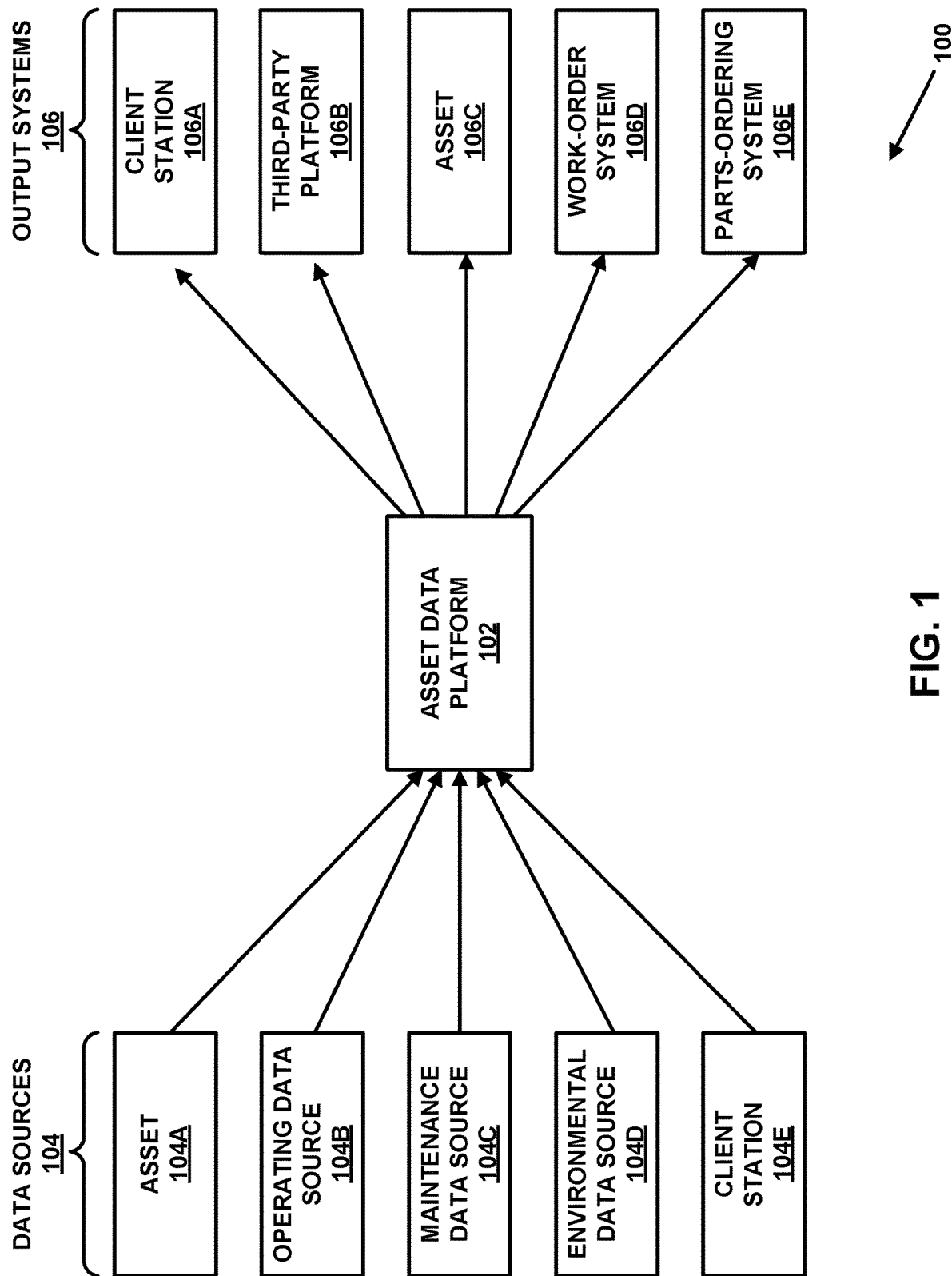
FIG. 1 depicts an example network configuration in which example embodiments may be implemented.

Turning now to the figures, FIG. 1 depicts an example network configuration 100 in which example embodiments may be implemented. As shown, network configuration 100 includes at its core a central computing system 102, which may be communicatively coupled to one or more data sources 104 and one or more output systems 106 via respective communication paths. In such an arrangement, central computing system 102 may generally serve as an "asset data platform" (also referred to herein as a "data analytics platform") that is configured to perform functions to facilitate the monitoring, analysis, and/or management of various types of "assets," which may take various forms.

For instance, some representative types of assets that may be monitored by asset data platform 102 may include electric power generation equipment (e.g., wind turbines, gas turbines, coal boilers), transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), petroleum production equipment (e.g., gas compressors, distillation columns, pipelines), and data network nodes (e.g., personal computers, routers, bridges, gateways, switches, etc.), among other examples. Additionally, an asset may have various other characteristics that more specifically define the type of asset, examples of which may include the asset's brand, make, model, vintage, and/or software version, among other possibilities. In this respect, depending on the implementation, the assets monitored by asset data platform 102 may either be of the same type or various different types. Additionally yet, the assets monitored by asset data platform 102 may be arranged into one or more "sites" (or "parks"/"farms") of assets, which refers to any group or two or more assets that are related to one another in some manner (regardless of whether such assets are of the same type).

Broadly speaking, asset data platform 102 may comprise one or more computing systems that have been provisioned with software for carrying out one or more of the platform functions disclosed herein, including but not limited to receiving data related to the operation and/or management of assets (broadly referred to herein as "asset-related data") from data sources 104, performing data ingestion and/or data analytics operations on the asset-related data received from asset data sources 104, and then outputting data and/or instructions related to the operation and/or management of assets to output systems 106. The one or more computing systems of asset data platform 102 may take various forms and be arranged in various manners.

For instance, as one possibility, asset data platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates asset data platform 102 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, asset data platform 102 may comprise one or more dedicated servers that have been provisioned with software for carrying out one or more of the platform functions disclosed herein. Other implementations of asset data platform 102 are possible as well.

Further, in practice, the software for carrying out the disclosed platform functions may take various forms. As one possibility, the platform software may comprise executable program instructions that cause asset data platform 102 to perform data ingestion operations on asset-related data received from data sources 104, including but not limited to extraction, transformation, and loading operations, among other examples. As another possibility, the platform software may comprise executable program instructions that cause asset data platform 102 to perform data analytics operations based on the asset-related data received from data sources 104, including but not limited to failure prediction, anomaly detection, noise filtering, predictive recommendations, and label correction, among other examples. As yet another possibility, the platform software may comprise executable program instructions that cause asset data platform 102 to output data and/or instructions related to the operation and/or management of assets for receipt by one or more output systems 106.

As one specific example, the platform software may comprise executable program instructions for outputting data related to the operation and/or management of assets that is to be presented to a user (e.g., asset-related data received from data sources 104 and/or the results of the data analytics operations performed by asset data platform 102), and these program instructions may take the form of discrete "applications" that are each tailored for particular end users, particular groups of assets, and/or particular purposes. Some representative examples of such applications may include an asset performance management application, an asset site management application, a service optimization application, and an asset dealer operations application, among other possibilities.

The software for carrying out the disclosed platform functions may take various other forms as well.

As described above, asset data platform 102 may be configured to receive asset-related data from one or more data sources 104. These data sources—and the asset-related data output by such data sources—may take various forms. To illustrate, FIG. 1 shows some representative examples of data sources 104 that may provide asset-related data to asset data platform 102, which are discussed in further detail below. However, it should be understood that these example data sources are merely provided for purposes of illustration, and that asset data platform 102 may be configured to receive asset-related data from other types of data sources as well.

For instance, one type of data source 104 may take the form of an asset 104A, which may be equipped with components that are configured to capture data that is indicative of the operation of the asset—referred to herein as "operating data"—and then transmit the asset's operating data to asset data platform 102 over the respective communication path between asset 104A and asset data platform 102. In this respect, asset 104A may take any of the various forms described above, including but not limited to electric power generation equipment, transport vehicles, heavy equipment, manufacturing equipment, and/or petroleum production equipment, among other types of assets. Further, it should be understood that the components of asset 104A for capturing and transmitting the asset's operating data either may be included as part of asset 104A as assembled and installed at a site or may be affixed to asset 104A at some later date, among other possibilities.

The operating data that is captured and sent by asset 104A may take various forms. As one possibility, an asset's operating data may include sensor data that comprises time-series measurements for certain operating parameters of the asset, examples of which may include vibration, speed, velocity, acceleration, location, weight, temperature, pressure, friction, power usage, throttle position, fluid usage, fluid level, voltage, current, magnetic field, electric field, presence or absence of objects, current position of a component, and power generation, among many others. As another possibility, an asset's operating data may include abnormal-conditions data that indicates occurrences of discrete abnormal conditions at the asset, examples of which include fault codes that indicate the occurrence of certain faults at the asset (e.g., when an operating parameter exceeds a threshold), asset shutdown indicators, and/or other types of abnormal-condition indicators. As yet another possibility, an asset's operating data may include data that has been derived from the asset's sensor data and/or abnormal-conditions data, examples of which may include "roll-up" data (e.g., an average, mean, median, etc. of the raw measurements for an operating parameter over a given time window) and "features" data (e.g., data values that are derived based on the raw measurements of two or more of the asset's operating parameters). An asset's operating data may take various other forms as well.

In practice, an asset's operating data may also include or be associated with data that identifies the origin of the operating data. This origin data may take various forms. For example, such origin data may include identifying information for the originating asset (e.g., an asset ID and/or data indicating the asset's type, brand, make, model, age, software version, etc.) and/or identifying information for the component of asset 104A that captured the operating data (e.g., a sensor ID), among other possibilities. As another example, such origin data may include data indicating the time at which the operating data was captured (e.g., a timestamp) and/or the asset's location when the operating data was captured (e.g., GPS coordinates), to the extent that such location is not otherwise included in the operating data. Asset data platform 102 may receive other types of data from asset 104A as well.

Further, asset data platform 102 may be configured to receive operating data from asset 104A in various manners. As one possibility, asset 104A may be configured to send its operating data to asset data platform 102 in a batch fashion, in which case asset data platform 102 may receive periodic transmissions of operating data from asset 104A (e.g., on an hourly, daily, or weekly basis). As another possibility, asset data platform 102 may receive operating data from asset 104A in a streaming fashion as such operating data is captured by asset 104A. As yet another possibility, asset data platform 102 may receive operating data from asset 104A in response to sending a request for such data to asset 104A, in which case asset data platform 102 may be configured to periodically send requests for operating data to asset 104A. Asset data platform 102 may be configured to receive operating data from asset 104A in other manners as well.

Another type of data source 104 may take the form of operating data source 104B, which may comprise a computing system that is configured to receive operating data from one or more upstream sources of operating data (e.g., assets) and then provide this operating data to asset data platform 102 over the respective communication path between operating data source 104B and asset data platform 102. Such an operating data source may take various forms. As one possibility, operating data source 104B may comprise an existing data platform of a third-party organization that receives and/or maintains operating data for one or more assets, such as a data platform operated by an asset owner, an asset dealer, an asset manufacturer, an asset repair shop, or the like. As another possibility, operating data source 104B may comprise an intermediary system that compiles operating data from a plurality of upstream sources of operating data and then provides that compiled operating data to asset data platform 102. For example, such an intermediary system may take the form of a computing system located in proximity to a site of assets (e.g., at a wind farm) that is configured to compile operating data for the fleet of assets or a computing system that is configured to compile operating data maintained by several third-party data platforms, among other possibilities. Operating data source 104B may take other forms as well.

The operating data that is maintained and sent by operating data source 104B may take various forms, including but not limited to any of the forms described above. In addition to the operating data received from the one or more upstream sources, the operating data provided by operating data source 104B may also include additional operating data that is generated by operating data source 104B itself, such as operating data that operating data sources 104B derives based on the operating data received from the one or more upstream sources (e.g., abnormal-conditions data, roll-up data, features data, etc.).

Further, as with asset 104A, asset data platform 102 may be configured to receive operating data from operating data source 104B in various manners. As one possibility, operating data source 104B may be configured to send its operating data to asset data platform 102 in a batch fashion, in which case asset data platform 102 may receive periodic transmissions of operating data from operating data source 104B (e.g., on an hourly, daily, or weekly basis). As another possibility, asset data platform 102 may receive operating data from operating data source 104B in a streaming fashion as such operating data is received and/or otherwise generated by operating data source 104B. As yet another possibility, asset data platform 102 may receive operating data from operating data source 104B in response to sending a request for such data to operating data source 104B, in which case asset data platform 102 may be configured to periodically send requests for operating data to operating data source 104B. As still another possibility, asset data platform 102 may receive operating data from operating data source 104B by accessing an Application Programming Interface (API) that has been made available by operating data source 104B, subscribing to a service provided by operating data source 104B, or the like. Asset data platform 102 may be configured to receive operating data from operating data source 104B in other manners as well.

Yet another type of data source 104 may take the form of an asset maintenance data source 104C, which may comprise a computing system that is configured to generate and/or receive data related to the maintenance of a plurality of assets—referred to herein as "maintenance data"—and then send this maintenance data to asset data platform 102 over the respective communication path between asset maintenance data source 104C and asset data platform 102. In this respect, asset maintenance data source 104C may take various forms. As one possibility, asset maintenance data source 104C may comprise an existing data platform of a third-party organization that is interested in tracking the maintenance of assets, such as an asset owner, asset dealer, asset manufacturer, asset repair shop, or the like. As another possibility, asset maintenance data source 104C may comprise an intermediary system that compiles asset maintenance data from multiple upstream sources (e.g., multiple repair shops) and then provides that compiled maintenance data to asset data platform 102. Asset maintenance data source 104C may take other forms as well.

The asset maintenance data that is maintained and sent by asset maintenance data source 104C may take various forms. As one example, the asset maintenance data may include details regarding inspections, maintenance, servicing, and/or repairs that have been performed or are scheduled to be performed on assets (e.g., work order data). As another example, the asset maintenance data may include details regarding known occurrences of failures at assets (e.g., date of failure occurrence, type of failure occurrence, etc.). Other examples are possible as well. As with the operating data, the asset maintenance data may also include or be associated with data indicating the origins of the asset maintenance data (e.g., source identifier, timestamp, etc.).

Further, asset data platform 102 may be configured to receive asset maintenance data from asset maintenance data source 104C in various manners, including but not limited to any of the manners discussed above with respect to operating data source 104B.

Still another type of data source 104 may take the form of environmental data source 104D, which may comprise a computing system that is configured to generate and/or receive data about an environment in which assets operate— referred to herein as "environmental data"—and then send this data to asset data platform 102 over the respective communication path between environmental data source 104D and asset data platform 102. In this respect, environmental data source 104D—and the environmental data provided thereby—may take various forms.

As one possibility, environmental data source 104D may take the form of a weather data source that provides information regarding the weather at locations where assets operate (e.g., ambient temperature, air pressure, humidity, wind direction, wind speed, etc.). As another possibility, environmental data source 104D may take the form of a geospatial data source that provides information regarding the geography and/or topology at locations where assets operate. As yet another possibility, environmental data source 104D may take the form of a satellite image data source that provides satellite imagery for locations where assets operate. Environmental data source 104D may take other forms as well.

Further, in practice, asset data platform 102 may be configured to receive environmental data from asset environmental data source 104D in various manners, including but not limited to any of the manners discussed above with respect to operating data source 104B.

Another type of data source 104 may take the form of client station 104E, which may comprise any computing device that is configured to receive user input related to the operation and/or management of assets (e.g., information entered by a park operator, a repair technician, or the like) and then send that user input to asset data platform 102 over the respective communication path between client station 104E and asset data platform 102. In this respect, client station 104E may take any of various forms, examples of which may include a desktop computer, a laptop, a netbook, a tablet, a smartphone, and/or a personal digital assistant (PDA), among other possibilities.

The user input that is entered into client station 104E and sent to asset data platform 102 may comprise various different kinds of information, including but not limited to the kinds of information discussed above with respect to the other data sources. For instance, as one possibility, the user input may include certain kinds of operating data, maintenance data, and/or environmental data that may be input into asset data platform 102 by a user rather than being received from one of the aforementioned data sources. As another possibility, the user input may include certain user-defined settings or logic that is to be used by asset data platform 102 when performing data ingestion and/or data analytics operations. The user input that is entered into client station 104E and sent to asset data platform 102 may take various other forms as well.

The aforementioned data sources 104 are merely provided for purposes of illustration, and it should be understood that the asset data platform's data sources may take various other forms as well. For instance, while FIG. 1 shows several different types of data sources 104, it should be understood that asset data platform 102 need not be configured to receive asset-related data from all of these different types of data sources, and in fact, asset data platform 102 could be configured to receive asset-related data from as little as a single data source 104. Further, while data sources 104A-E have been shown and described separately, it should be understood that these data sources may be combined together as part of the same physical computing system (e.g., an organization's existing data platform may serve as both operating data source 104B and maintenance data source 104C). Further yet, it should be understood that asset data platform 102 may be configured to receive other types of data related to the operation and/or management of assets as well, examples of which may include asset management data (e.g., operational plans), enterprise data (e.g., point-of-sale (POS) data, customer relationship management (CRM) data, enterprise resource planning (ERP) data, etc.), and/or financial markets data, among other possibilities.

As shown in FIG. 1, asset data platform 102 may also be configured to output asset-related data and/or instructions for receipt by one or more output systems 106. These output systems—and the data and/or instructions provided to such output systems—may take various forms. To illustrate, FIG. 1 shows some representative examples of output systems 106 that may receive asset-related data and/or instructions from asset data platform 102, which are discussed in further detail below. However, it should be understood that these example output systems are merely provided for purposes of illustration, and that asset data platform 102 may be configured to output asset-related data and/or instructions to other types of output systems as well.

For instance, one type of output system 106 may take the form of client station 106A, which may comprise any computing device that is configured to receive asset-related data from asset data platform 102 over the respective communication path between client station 106A and asset data platform 102 and then present such data to a user (e.g., via a front-end application that is defined by asset data platform 102). In this respect, client station 106A may take any of various forms, examples of which may include a desktop computer, a laptop, a netbook, a tablet, a smartphone, and/or a PDA, among other possibilities. Further, it should be understood that client station 106A could either be a different device than client station 104E or could be the same device as client station 104E.

The asset-related data that is output for receipt by client station 106A may take various forms. As one example, this asset-related data may include a restructured version of asset-related data that was received by asset data platform 102 from one or more data sources 104 (e.g., operating data, maintenance data, etc.). As another example, this asset-related data may include data that is generated by asset data platform 102 based on the asset-related data received from data sources 104, such as data resulting from the data analytics operations performed by asset data platform 102 (e.g., predicted failures, recommendations, alerts, etc.). Other examples are possible as well.

Along with the asset-related data that is output for receipt by client station 106A, asset data platform 102 may also output associated data and/or instructions that define the visual appearance of a front-end application (e.g., a graphical user interface (GUI)) through which the asset-related data is to be presented on client station 106A. Such data and/or instructions for defining the visual appearance of a front-end application may take various forms, examples of which may include Hypertext Markup Language (HTML), Cascading Syle Sheets (CSS), and/or JavaScript, among other possibilities. However, depending on the circumstance, it is also possible that asset data platform 102 may output asset-related data to client station 106A without any associated data and/or instructions for defining the visual appearance of a front-end application.

Further, client station 106A may receive asset-related data from asset data platform 102 in various manners. As one possibility, client station 106A may send a request to asset data platform 102 for certain asset-related data and/or a certain front-end application, and client station 106A may then receive asset-related data in response to such a request. As another possibility, asset data platform 102 may be configured to "push" certain types of asset-related data to client station 106A, such as scheduled or event-based alerts, in which case client station 106A may receive asset-related data from asset data platform 102 in this manner. As yet another possibility, asset data platform 102 may be configured to make certain types of asset-related data available via an API, a service, or the like, in which case client station 106A may receive asset-related data from asset data platform 102 by accessing such an API or subscribing to such a service. Client station 106A may receive asset-related data from asset data platform 102 in other manners as well.

Another type of output system 106 may take the form of a data platform 106B operated by a third-party organization interested in the operation and/or management of assets, such as an asset owner, an asset dealer, an asset manufacturer, an asset repair shop, or the like. For instance, a third-party organization such as this may have its own data platform 106B that already enables users to access and/or interact with asset-related data through front-end applications that have been created by the third-party organization, but data platform 106B may not be programmed with the capability to ingest certain types of asset-related data or perform certain types of data analytics operations. In such a scenario, asset data platform 102 may be configured to output certain asset-related data for receipt by data platform 106B.

The asset-related data that is output for receipt by data platform 106B may take various forms, including but not limited any of the forms described above in connection with the output to client station 106A. However, unlike for client station 104A, the asset-related data that is output for receipt by data platform 106B typically need not include any associated data and/or instructions for defining the visual appearance of a front-end application, because data platform 106B may be performing operations on the asset-related data from asset data platform 102 beyond presenting it to a user via a front-end application.

Further, data platform 106B may receive asset-related data from asset data platform 102 in various manners, including but not limited to any of the manners discussed above with respect to client station 106A (e.g., by sending a request to asset data platform 102, having data "pushed" by asset data platform, or accessing an API or service provided by asset data platform 102).

Yet another type of output system 106 may take the form of asset 106C (or an intermediary system that is in communication with asset 106C), which may be equipped with components that are configured to receive asset-related data and/or instructions from asset data platform 102 and then act in accordance with the received data and/or instructions. In this respect, asset 106C may take any of the various forms described above, including but not limited to electric power generation equipment, transport vehicles, heavy equipment, manufacturing equipment, and/or petroleum production equipment, among other types of assets. Further, it should be understood that asset 106C could either be a different asset than asset 104A or could be the same asset as asset 104A.

The asset-related data and/or instructions that are output for receipt by asset 106C may take various forms. As one example, asset data platform 102 may be configured to send asset 106C certain data that has been generated by asset data platform 102 based on the asset-related data received from data sources 104, such as data resulting from a data analytics operation performed by asset data platform 102 (e.g., predicted failures, recommendations, alerts, etc.), in which case asset 106C may receive this data and then potentially adjust its operation in some way based on the received data. As another example, asset data platform 102 may be configured to generate and send an instruction for asset 106C to adjust its operation in some way (e.g., based on the asset-related data received from data sources 104), in which case asset 106C may receive this instruction and then potentially adjust its operation in accordance with the instruction. As yet another example, asset data platform 102 may be configured to generate and send an instruction for asset 106C to perform a data analytics operation locally at asset 106C, in which case asset 106C may receive the instruction and then locally perform the data analytics operation. In some cases, in conjunction with sending asset 106C an instruction to perform a data analytics operation, asset data platform 102 may also provide asset 106C with executable program instructions and/or program data that enable asset 106C to perform the data analytics operation (e.g., a predictive model). However, in other cases, asset 106C may already be provisioned with executable program instructions for performing the data analytics operation. Other examples are possible as well.

Further, in practice, asset 106C may receive asset-related data and/or instructions from asset data platform 102 in various manners, including but not limited to any of the manners discussed above with respect to client station 106A.

Still another type of output system 106 may take the form of work-order system 106D, which may comprise a computing system that is configured to receive asset-related data and/or instructions from asset data platform 102 over the respective communication path between work-order system 106D and asset data platform 102 and then generate a work order in accordance with the received data and/or instructions.

A further type of output system 106 may take the form of parts-ordering system 106E, which may comprise a computing system that is configured to receive asset-related data and/or instructions from asset data platform 102 over the respective communication path between parts-ordering system 106E and asset data platform 102 and then generate a parts order in accordance with the received data and/or instructions.

The aforementioned output systems 106 are merely provided for purposes of illustration, and it should be understood that output systems in communication with asset data platform 102 may take various other forms as well. For instance, while FIG. 1 shows several different types of output systems 106, it should be understood that asset data platform 102 need not be configured to output asset-related data and/or instructions for receipt by all of these different types of output systems, and in fact, asset data platform 102 could be configured to output asset-related data and/or instructions for receipt by as little as a single output system 106. Further, while output systems 106A-E have been shown and described separately, it should be understood that these output systems may be combined together as part of the same physical computing system. Further yet, it should be understood that asset data platform 102 may be configured to output asset-related data and/or instructions for receipt by other types of output systems as well.

As discussed above, asset data platform 102 may communicate with the one or more data sources 104 and one or more output systems 106 over respective communication paths. Each of these communication paths may generally comprise one or more communication networks and/or communications links, which may take any of various forms. For instance, each respective communication path with asset data platform 102 may include any one or more of point-to-point links, Personal Area Networks (PANs), Local-Area Networks (LANs), Wide-Area Networks (WANs), such as the Internet or cellular networks, cloud networks, and/or operational technology (OT) networks, among other possibilities. Further, the communication networks and/or links that make up each respective communication path with asset data platform 102 may be wireless, wired, or some combination thereof, and may carry data according to any of various different communication protocols.

Although not shown, the respective communication paths with asset data platform 102 may also include one or more intermediate systems. For example, it is possible that a given data source 104 may send asset-related data to one or more intermediary systems, such as an aggregation system, and asset data platform 102 may then be configured to receive the asset-related data from the one or more intermediary systems. As another example, it is possible that asset data platform 102 may communicate with a given output system 106 via one or more intermediary systems, such as a host server (not shown). Many other configurations are also possible.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
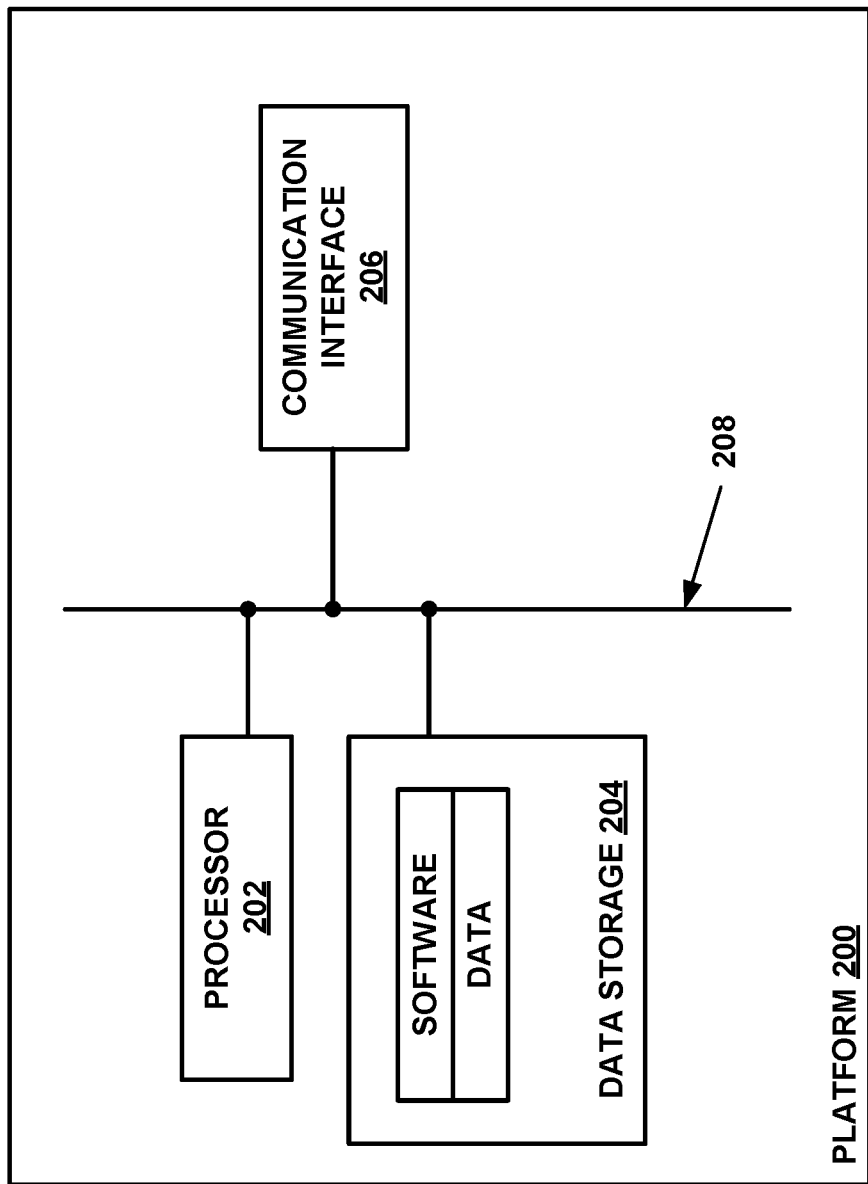
FIG. 2 depicts a simplified block diagram of an example asset data platform from a structural perspective.

FIG. 2 is a simplified block diagram illustrating some structural components that may be included in an example computing platform 200, which could serve as the asset data platform 102 in FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 2, data storage 204 may be provisioned with software components that enable the platform 200 to carry out the functions disclosed herein. These software components may generally take the form of program instructions that are executable by the processor 202 to carry out the disclosed functions, which may be arranged together into software applications, virtual machines, software development kits, toolsets, or the like.

Further, data storage 204 may be arranged to store asset-related data in one or more databases, file systems, or the like. For example, data storage 204 may be configured to store data using technologies such Apache Cassandra, Apache Hadoop, PostgreSQL, and/or MongoDB, among other possibilities. Data storage 204 may take other forms and/or store data in other manners as well.

Communication interface 206 may be configured to facilitate wireless and/or wired communication with data sources and output systems, such as data sources 104 and output systems 106 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

Figure 3:
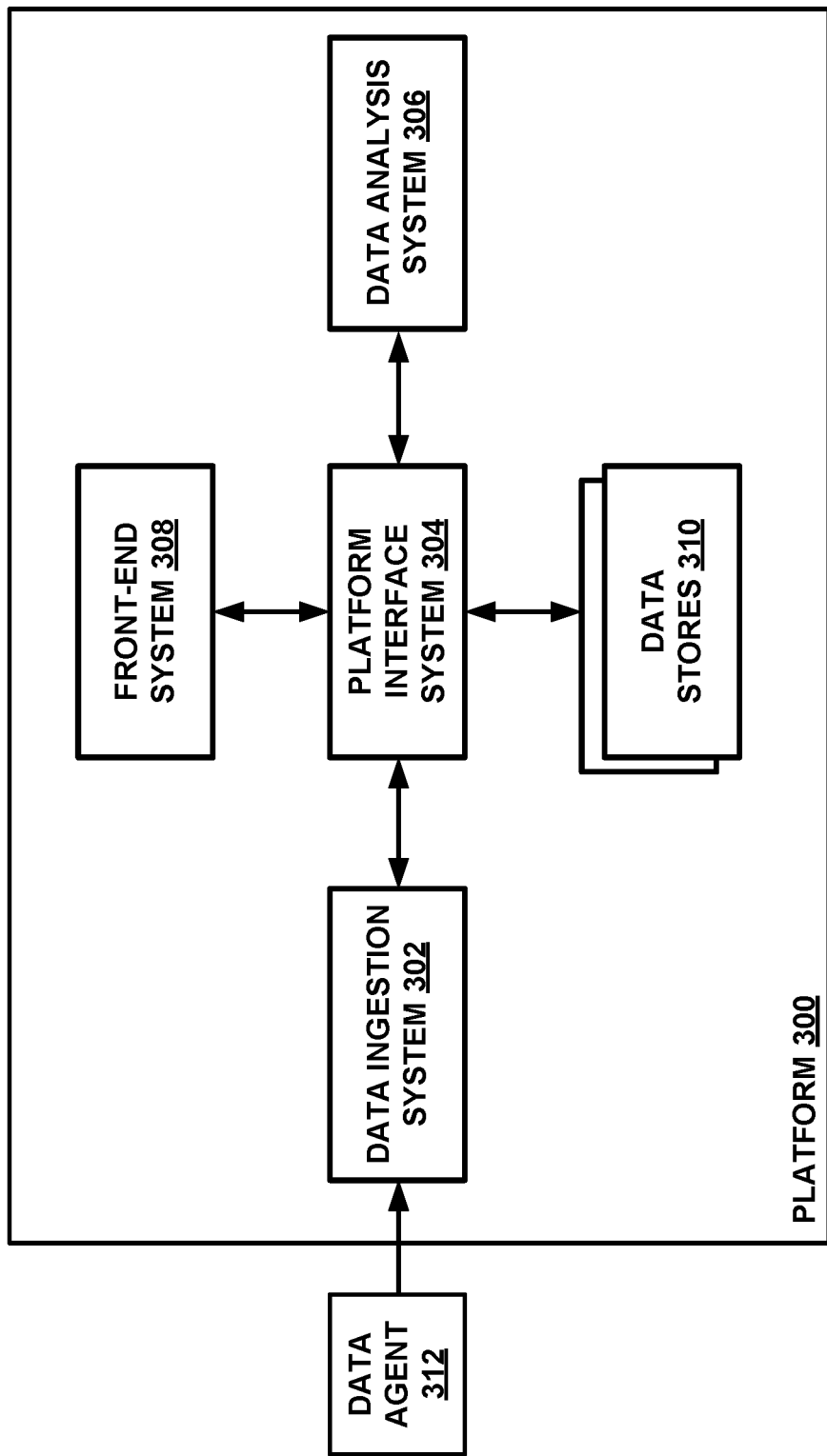
FIG. 3 depicts a simplified block diagram of an example asset data platform from a functional perspective.

Referring now to FIG. 3, another simplified block diagram is provided to illustrate some functional systems that may be included in an example platform 300. For instance, as shown, the example platform 300 may include a data ingestion system 302, a platform interface system 304, a data analysis system 306, a front-end system 308, and one or more data stores 310, each of which comprises a combination of software and hardware that is configured to carry out particular functions. In line with the discussion above, these functional systems may be implemented on one or more computing systems, which may take the form of computing infrastructure of a public, private, and/or hybrid cloud or one or more dedicated servers, among other possibilities.

At a high level, data ingestion system 302 may be configured to ingest asset-related data received from the platform's one or more data sources, transform the ingested data into a standardized structure, and then pass the ingested data to platform interface system 304. In this respect, the function of ingesting received data may be referred to as the "extraction" (or "acquisition") stage within data ingestion system 302, the function of transforming the ingested data into a desired structure may be referred to as the "transformation" stage within data ingestion system 302, and the function of passing the ingested data to platform interface system 304 may be referred to as the "load" stage within data ingestion system 302. (Alternatively, these functions may collectively be referred to as the ETL stage). In some embodiments, data ingestion system 302 may also be configured to enhance the ingested data before passing it to platform interface system 304. This function of enhancing the ingested data may be referred to as the "enhancement" stage within data ingestion system 302. However, data ingestion system 302 may take various other forms and perform various other functions as well.

At the extraction stage, data ingestion system 302 may be configured to receive and ingest various types of asset-related data from various types of data sources, including but not limited to the types of asset-related data and data sources 104 discussed above with reference to FIG. 1. Further, in line with the discussion above, data ingestion system 302 may be configured to receive asset-related data from a data source in various manners. For instance, as one possibility, data ingestion system 302 may be configured to receive batch transmissions of asset-related data from a data source. As another possibility, data ingestion system 302 may be configured to receive asset-related data from a data source in a streaming fashion. As yet another possibility, data ingestion system 302 may be configured to receive asset-related data from a data source in response to sending a request for such data to the data source, in which case data ingestion system 302 may be configured to periodically send requests for asset-related data to the data source. As still another possibility, data ingestion system 302 may receive asset-related data from a data source by subscribing to a service provided by the data source (e.g., via an API or the like). Data ingestion system 302 may be configured to receive asset-related data from a data source in other manners as well.

Before data ingestion system 302 receives asset-related data from certain data sources, there may also be some configuration that needs to place at such data sources. For example, a data source may be configured to output the particular set of asset-related data that is of interest to platform 300. To assist with this process, the data source may be provisioned with a data agent 312, which generally comprises a software component that functions to access asset-related data at the given data source, place the data in the appropriate format, and then facilitate the transmission of that data to platform 300 for receipt by data ingestion system 302. In other cases, however, the data sources may be capable of accessing, formatting, and transmitting asset-related data to platform 300 without the assistance of a data agent.

Turning to the transformation phase, data ingestion system 302 may generally be configured to map and transform ingested data into one or more predefined data structures, referred to as "schemas," in order to standardize the ingested data. As part of this transformation stage, data ingestion system 302 may also drop any data that cannot be mapped to a schema.

In general, a schema is an enforceable set of rules that define the manner in which data is to be structured in a given system, such as a data platform, a data store, etc. For example, a schema may define a data structure comprising an ordered set of data fields that each have a respective field identifier (e.g., a name) and a set of parameters related to the field's value (e.g., a data type, a unit of measure, etc.). In such an example, the ingested data may be thought of as a sequence of data records, where each respective data record includes a respective snapshot of values for the defined set of fields. The purpose of a schema is to define a clear contract between systems to help maintain data quality, which indicates the degree to which data is consistent and semantically correct.

In some implementations, data ingestion system 302 may also be configured to map and transform different types of asset-related data to different schemas. For instance, if the asset-related data received from different data sources is to be input into different types of data analytics operations that have different input formats, it may be advantageous to map and transform such asset-related data received from the different data sources to different schemas.

As part of the transformation stage, data ingestion system 302 may also be configured to perform various other quality checks on the asset-related data before passing it to platform interface system 304. For example, data ingestion system 302 may assess the reliability (or "health") of certain ingested data and take certain actions based on this reliability, such as dropping any unreliable data. As another example, data ingestion system 302 may "de-dup" certain ingested data by comparing it against data that has already been received by platform 300 and then ignoring or dropping duplicative data. As yet another example, data ingestion system 302 may determine that certain ingested data is related to data already stored in the platform's data stores (e.g., a different version of the same data) and then merge the ingested data and stored data together into one data structure or record. Data ingestion system 302 may perform other types of quality checks as well.

It should also be understood that certain data ingested by data ingestion system 302 may not be transformed to a predefined schema (i.e., it is possible that certain ingested data will be "passed through" without performing any transformation on the data), in which case platform 300 may operate on this ingested data as it exists in its original data structure.

As noted above, in some embodiments, data ingestion system 302 may also include an "enhancement" stage where data ingestion system 302 enhances the ingested data before passing it to platform interface system 304. In this respect, data ingestion system 302 may enhance the ingested data in various manners. For instance, data ingestion system 302 may supplement the ingested data with additional asset-related data that is derived by and/or otherwise accessible to platform 300. Such additional data may take various forms. As one example, if the ingested data comprises sensor data, data ingestion system 302 may be configured to supplement the sensor data with "roll-up" data and/or "features" data that is derived from the sensor data. As another possible example, data ingestion system 302 may generate and append certain "enrichments" to the ingested data, examples of which are described in U.S. application Ser. No. 16/004,652, which is incorporated by reference herein in its entirety. Data ingestion system 302 may enhance the ingested data in other manners as well.

After data ingestion system 302 has performed any appropriate transformation and/or enhancement operations on the ingested data, it may pass the ingested data to platform interface system 304, which may be configured to receive data from data ingestion system 302, store the received data in one or more of data stores 310, and make the data available for consumption by the other functional systems of platform 300—including data analysis system 306 and/or front-end system 308. In this respect, the function of passing the ingested data from data ingestion system 302 to platform interface system 304 may take various forms.

According to an example implementation, data ingestion system 302 may begin by categorizing the ingested data into separate data categories (or "domains") that are to be consumed separately by the platform's other functional systems. In turn, data ingestion system 302 may publish the data within each category to a corresponding interface (e.g., an API or the like) that is provided by platform interface system 304. However, it should be understood that other approaches for passing the ingested data from data ingestion system 302 to platform interface system 304 may be used as well, including the possibility that data ingestion system 302 may simply publish the ingested data to a given interface of platform interface system 304 without any prior categorization of the ingested data.

After platform interface system 304 receives the ingested data from data ingestion system 302, platform interface system 304 may cause that data to be stored at the appropriate data stores 310 within platform 300. For instance, in the event that platform interface system 304 is configured to receive different categories of ingested data, platform interface system 304 may be configured store data from a first category into a first data store 310, store data from a second category into a second data store 310, and so on. In addition, platform interface system 304 may store an archival copy of the ingested data into an archival data store 310. Platform interface system 304 may store the ingested data in other manners as well.

After receiving the ingested data from data ingestion system 302, platform interface system 304 may also make the ingested data available for consumption by the platform's other functional systems—including data analysis system 306 and front-end system 308. In this respect, platform interface system 304 may make the ingested data available for consumption in various manners, including through the use of message queues or the like.

After consuming data from platform interface system 304, data analysis system 306 may generally function to perform data analytics operations on such data and then pass the results of those data analytics operations back to platform interface system 304. These data analytics operations performed by data analysis system 306 may take various forms.

As one possibility, data analysis system 306 may create and/or execute predictive models related to asset operation based on asset-related data received from one or more data sources, such as predictive models that are configured to predict occurrences of failures at an asset. One example of a predictive model that may be created and executed by data analysis system 306 is described in U.S. application Ser. No. 14/732,258, which is incorporated by reference herein in its entirety.

As another possibility, data analysis system 306 may create and/or execute models for detecting anomalies in asset-related data received from one or more data sources. Some examples of anomaly detection models that may be created and executed by data analysis system 306 are described in U.S. application Ser. Nos. 15/367,012 and 15/788,622, which are incorporated by reference herein in their entirety.

As yet another possibility, data analysis system 306 may be configured to create and/or execute other types of data analytics programs based on asset-related data received from one or more data sources, examples of which include data analytics programs that evaluate asset-related data using a set of predefined rules (e.g., threshold-based rules), data analytics programs that generate predictive recommendations, data analytics programs that perform noise filtering, and data analytics programs that perform image analysis, among other possibilities.

The data analytics operations performed by data analysis system 306 may take various other forms as well.

Further, it should be understood that some of the data analytics operations discussed above may involve the use of machine learning techniques, examples of which may include regression, random forest, support vector machines (SVM), artificial neural networks, Naïve Bayes, decision trees, dimensionality reduction, k-nearest neighbor (kNN), gradient boosting, clustering, and association, among other possibilities.

As discussed above, after performing its data analytics operations, data analysis system 306 may then pass the results of those operations back to platform interface system 304, which may store the results in the appropriate data store 310 and make such results available for consumption by the platform's other functional systems—including data analysis system 306 and front-end system 308.

In turn, front-end system 308 may generally be configured to drive front-end applications that may be presented to a user via a client station (e.g., client station 106A). Such front-end applications may take various forms. For instance, as discussed above, some possible front-end applications for platform 300 may include an asset performance management application, an asset fleet management application, a service optimization application, and/or an asset dealer operations application, among other possibilities.

In practice, front-end system 308 may generally function to access certain asset-related data from platform interface system 304 that is to be presented to a user as part of a front-end application and then provide such data to the client station along with associated data and/or instructions that define the visual appearance of the front-end application. Additionally, front-end system 308 may function to receive user input that is related to the front-end applications for platform 300, such as user requests and/or user data. Additionally yet, front-end system 308 may support a software development kit (SDK) or the like that allows a user to create customized front-end applications for platform 300. Front-end system 308 may perform other functions as well.

Platform 300 may also include other functional systems that are not shown. For instance, although not shown, platform 300 may include one or more additional functional systems that are configured to output asset-related data and/or instructions for receipt by other output systems, such as third-party data platforms, assets, work-order systems, parts-ordering systems, or the like.

One of ordinary skill in the art will appreciate that the example platform shown in FIGS. 2-3 is but one example of a simplified representation of the structural components and/or functional systems that may be included in a platform, and that numerous others are also possible. For instance, other platforms may include structural components and/or functional systems not pictured and/or more or less of the pictured structural components and/or functional systems. Moreover, a given platform may include multiple, individual platforms that are operated in concert to perform the operations of the given platform. Other examples are also possible.

III. EXAMPLE WIND SITE

As discussed above with reference to FIG. 1, asset data platform 102 may be configured to perform functions to facilitate the monitoring, analysis, and/or management of various types of assets, such as wind turbines. Typically, a plurality of wind turbines is installed at a wind site (i.e., a "wind farm" or "wind park") that is arranged at a geographical location that experiences windy conditions and provides electricity to an existing power grid.

Figure 4A:
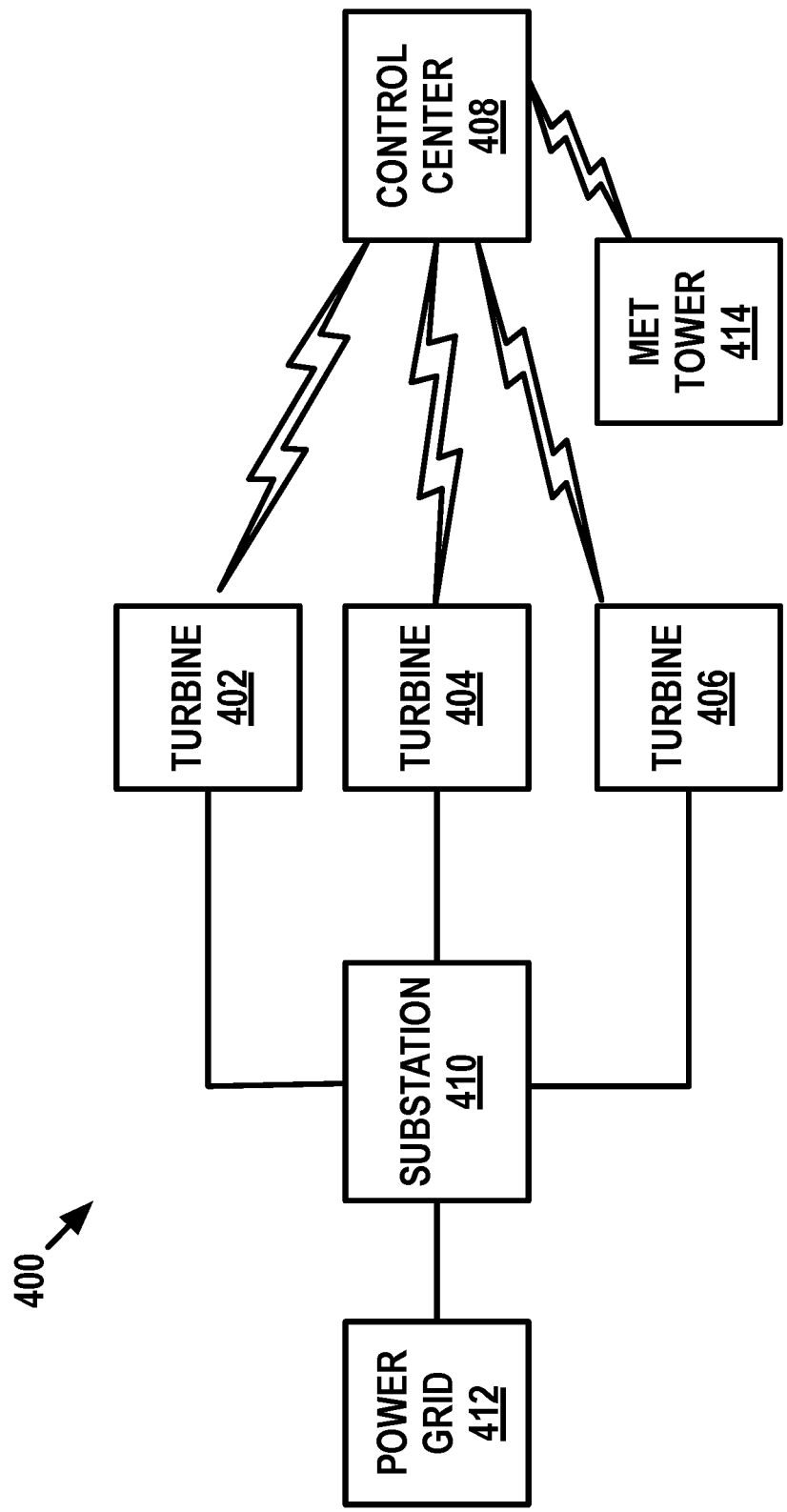
FIG. 4A depicts a simplified block diagram of an example wind site that is coupled to a power grid.

To illustrate, FIG. 4A provides a simplified block diagram of an example wind site 400 that is coupled to a power grid 412. As shown in FIG. 4A, wind site 400 may include one or more wind turbines 402, 404, and 406, at least one control center 408, at least one substation 410, and at least one meteorological evaluation (MET) tower 414. Wind site 400 may be coupled to power grid 412 via substation 410. It should be understood that wind site 400 may include additional components not shown and/or more or less of the depicted components. For instance, in example embodiments, wind site 400 may include multiple control centers or may not include a MET tower. Other example wind site configurations are also possible.

Generally, each wind turbine 402-406 is configured to convert wind energy into electricity that is provided to substation 410 via a wired connection, such as a transmission line. Substation 410 in turn provides that electricity to power grid 412. Wind turbines are discussed in further detail below with reference to FIG. 4B.

In practice, wind site 400's turbines 402-406 may be distributed across a geographical area that includes a uniform or variable topography. Moreover, the geographical area may be of a size such that environmental conditions may vary across the geographical area. For example, some portion of the geographical area may experience wind patterns, wind speeds, temperature, humidity, etc. that differ from other portions of the geographical area. Accordingly, at any given point in time, some of wind turbines 402-406 of wind site 400 may experience one or more environmental conditions in a different manner than other wind turbines, which may result in one wind turbine generating more electricity than other wind turbines and/or one wind turbine being deactivated while others continue to produce electricity.

In general, control center 408 may be configured to manage the operation of wind turbines 402-406. For example, control center 408 may be configured to send commands that cause certain wind turbines to activate or deactivate (i.e., attempt to capture wind energy or not). To facilitate this and other functions, control center 208 may include hardware components such as at least one processor, data storage, and at least one communication interface, all of which may be communicatively linked by a communication link that may take the form of a system bus, a communication network, or some other connection mechanism.

The at least one processor may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In turn, the data storage may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. The data storage may be provisioned with software components that enable control center 408 to carry out its functions. These software components may generally take the form of program instructions that are executable by the at least one processor to carry out functions, which may be arranged together into software applications, virtual machines, software development kits, toolsets, or the like. Further, the data storage may be arranged to store turbine-related data in one or more databases, file systems, or the like.

The at least one communication interface may be configured to facilitate wireless and/or wired communication with turbines 402-406, MET tower 414, and/or asset data platform 102 of FIG. 1, among other devices and systems. For example, control center 408 may collect wind-turbine data (e.g., operating data originating from a wind turbine) from some or all of the wind turbines 402-406, as well as meteorological data from MET tower 414, and perhaps maintain that data in data storage. Moreover, control center 408 may provide wind-turbine and/or meteorological data to asset data platform 102. As such, the at least one communication interface may take any suitable form for carrying out these functions, examples of which may include an Ethernet interface, a serial bus interface, a chipset and antenna adapted to facilitate wireless communication, and/or any other interface that provides for wireless and/or wired communication. The at least one communication interface may also include multiple communication interfaces of different types. Other configurations are possible as well.

As mentioned before, substation 410 may be electrically coupled to wind turbines 402-406 and may be generally configured to collect electricity from wind turbines 402-406 and provide that electricity to power grid 412. To facilitate these operations, substation 410 may include one or more electricity collection systems, one or more transformers (e.g., one or more step-up transformers), and infrastructure for coupling substation 410 to power grid 412, among other components. Moreover, substation 410 may be configured to provide to control center 408 respective electricity-production data for each wind turbine 402-406 indicating how much electricity each turbine is generating at any given time.

Power grid 412 may generally include infrastructure for providing electricity to utility companies and/or residents, among other possibilities. To help facilitate this functionality, power grid 412 may take the form of or include transmission lines configured to carry electricity to particular recipients. Power grid 412 may include additional components as well.

MET tower 414 may comprise one or more meteorological evaluation towers that are configured to capture and report meteorological conditions at wind site 400, such as wind speed, wind direction, temperature, humidity, barometric pressure, etc. measured by MET tower 414. As described above, wind site 400 may experience meteorological conditions that vary across the geographical area of wind site 400. Thus, it should be understood that MET towers may be installed at various locations around wind site 400 that experience different meteorological conditions such that these different conditions can be recorded and reported.

In one implementation, wind turbines 402-406 at wind site 400 may be configured to individually send wind-turbine data (e.g., operating data originating from a wind turbine or data originating from the wind turbine indicative of surrounding environmental conditions) to a remote data analytics platform, such as asset data platform 102. In another implementation, wind turbines 402-406 at wind site 400 may be configured to send wind-turbine data to control center 408 for wind site 400, which may be configured to aggregate the data received from wind turbines 402-406, and then send this wind-turbine data to a remote data analytics platform, such as data platform 102. In yet another implementation, wind turbines 402-406 at wind site 400 may be configured to send wind-turbine data to control center 408 for wind site 400, but control center 408 may be configured to operate as a local data analytics platform such that the wind-turbine data need not be sent to a remote data analytics platform. The wind-turbine data for the given wind site may be provided to a data analytics system in other manners as well.

In addition to receiving wind-turbine data, asset data platform 102 may also receive other data related to the operation of wind site 400. For example, data platform 102 may receive data captured by MET tower 414 installed at wind site 400, which may provide an indication of meteorological conditions at wind site 400 (e.g., wind speed, wind directions, etc.). As another example, data platform 102 may receive weather data for wind site 400 from a weather-data provider (e.g., environmental data source 104D). As yet another example, data platform 102 may receive maintenance data for wind turbines 402-406 at wind site 400 from a maintenance-data source (e.g., maintenance data source 104C). As a further example, data platform 102 may receive production data for wind turbines 402-406 at wind site 400 from substation 410 and/or power grid 412. Asset data platform 102 may receive other data related to the operation of the wind site 400 as well.

IV. EXAMPLE WIND TURBINE

Figure 4B:
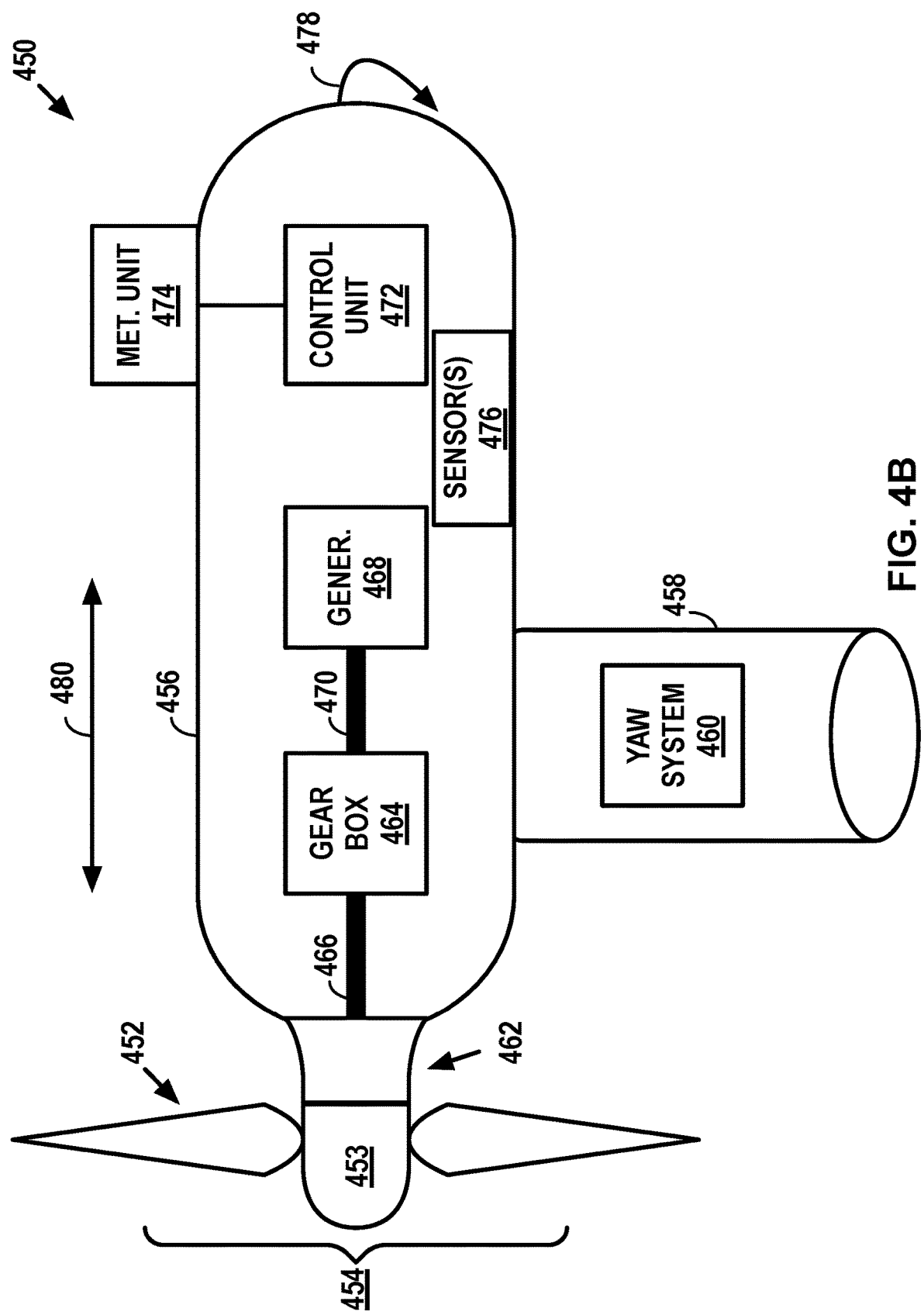
FIG. 4B depicts a simplified block diagram of an example wind turbine.

Turning to FIG. 4B, a simplified diagram of an example wind turbine 450 is depicted. Some or all of wind turbines 402-406 from FIG. 4A may be configured like wind turbine 450. As shown in FIG. 4B, wind turbine 450 includes multiple blades 452 that are mounted to a hub 453 that collectively form a rotor assembly 454 that is configured to rotate as wind passes over blades 452. Rotor 454 is connected to a nacelle 456 that sits atop a tower 458 that mounts wind turbine 450 to the ground at an installation location at a wind site.

Tower 458 may include a yaw system 460 that is generally configured to control the position of the upper structure of wind turbine 450 (e.g., rotor 454 and nacelle 456) to align the upper structure in a desired direction relative to the wind's direction. To help facilitate this functionality, yaw system 460 may include one or more motors and/or other actuators, drive shafts, gears, and control units, among other components.

Wind turbine 450 may also include a pitch system 462 that may be separate from or part of hub 453. Pitch system 462 may generally be configured to change the angle of the pitch of blades 452, collectively and/or individually, to help control the rotational speed of rotor 454, and pitch system 462 may also be configured to activate or deactivate rotor 454's ability to rotate (e.g., by engaging or disengaging a brake or the like). To help facilitate these operations, pitch system 462 may include one or more motors and/or other actuators, drive shafts, brakes, and control units, among other components.

Wind turbine 450 may include a number of subsystems within or atop of nacelle 456. As shown in FIG. 4B, hub 453 of rotor assembly 454 is physically coupled to a gearbox 464 via a drive shaft 466, which may be referred to as the low-speed drive shaft. Gearbox 464 in turn is physically coupled to a generator 468 via a drive shaft 470, which may be referred to as the high-speed drive shaft. Gearbox 464, drive shaft 466, generator 468, and drive shaft 470 collectively comprise wind turbine 450's drivetrain. Based on rotation of and torque on the drivetrain's drive shafts, generator 468 functions to generate electricity that travels on a wire (not shown) that extends down tower 458 to substation 410 of FIG. 4A.

In general, gear box 464 operates to connect drive shaft 466 to drive shaft 470. Gear box 464 may include two or more gears of differing sizes that cause drive shaft 470 to rotate at a higher rate than drive shaft 466. As a result, drive shaft 470 is configured to rotate at a rate that is sufficient to cause generator 468 to efficiently produce electricity. In some example embodiments, wind turbine 450 may not include gear box 464, such as when generator 468 is a "direct-drive" generator.

As suggested above, generator 468 is configured to convert mechanical work energy into electricity. In particular, generator 468 is driven by drive shaft 470 and as drive shaft 470 rotates, generator 468 converts the mechanical work performed by drive shaft 470 into electricity. Generator 468 may take the form of an induction generator, among other possibilities.

Nacelle 456 may also include a control unit 472 that generally manages the operation of wind turbine 450. Control unit 472 may include one or more processors (similar in nature to the above-discussed processors) and data storage (similar in nature to the above-discussed data storage) that includes program instructions that when executed by the one or more processors cause control unit 472 to perform various functions, some of which are described herein. Control unit 472 may be communicatively linked (either directly or indirectly) by a system bus, network, or other connection mechanism to one or more of wind turbine 450's subsystems, such as yaw system 460, pitch system 462, and/or perhaps other subsystems. Moreover, control unit 472 may be communicatively coupled to a meteorological unit 474 that sits atop of nacelle 456.

Meteorological unit 474 is generally configured to measure meteorological conditions of wind turbine 450's surroundings as those conditions are experienced at wind turbine 450's nacelle 456, such as wind speed, wind direction, temperature, humidity, barometric pressure, etc. Meteorological unit 474 may include at least one wind vane, an anemometer, and/or a variety of sensors configured to measure a variety of meteorological attributes. Meteorological unit 474 may output meteorological data indicative of meteorological attributes measured at wind turbine 450, which control unit 472 may be configured to maintain in data storage and/or relay to a control center or data analytics platform.

In operation, meteorological attributes measured by meteorological unit 474 may cause control unit 472 to in turn control one or more of wind turbine 450's subsystems. For example, meteorological unit 474 may provide control unit 472 data indicative of the present wind direction, which may in turn cause control unit 472 to control yaw system 460 to pivot wind turbine 450 a certain number of degrees clockwise to align with the wind direction. As another example, control unit 472 may receive from meteorological unit 474 data indicative of the present wind speed, which may in turn cause control unit 472 to cause pitch system 462 to disable rotor 454 from spinning (e.g., engage a brake) when the wind speed is above a threshold speed. Other example operations are also possible.

Wind turbine 450 may also be outfitted with various sensors 476 that are configured to monitor various operating conditions of wind turbine 450. In example embodiments, when wind turbine 450 was originally assembled and installed at its wind site, wind turbine 450 was equipped with a particular subset of sensors 476 (e.g., a subset of 6 vibration sensors) that includes at least one multi-dimensional sensor (e.g., a biaxial sensor) installed in wind turbine 450's nacelle or a part of wind turbine 450 that is coupled to the nacelle. This set of preinstalled sensors is typically included in a wind turbine to facilitate monitoring certain aspects of the wind turbine's operation, such as vibrations occurring within the wind turbine. Notably, however, this set of preinstalled sensors is not dedicated to monitoring or detecting rotor imbalance.

In example embodiments, wind turbine 450's at least one multi-dimensional sensor is configured to measure vibrations in two dimensions, such as vibrations corresponding to side-to-side movements of wind turbine 450 (the direction of which is represented by direction arrow 478) and vibrations corresponding to fore-to-aft movements of wind turbine 450 (the direction of which is represented by direction arrow 480). The side-to-side vibrations may correspond to the multi-dimensional sensor's x-axis, whereas the fore-to-aft vibrations may correspond to the multi-dimensional sensor's y-axis. In other example embodiments, wind turbine 450's at least one multi-dimensional sensor may be configured to measure vibrations in more than two dimensions.

Wind turbine 450 may include additional sensors 476 other than the particular set of sensors (e.g., the set of 6 preinstalled vibration sensors), where these additional sensors 476 monitor various other operating conditions of wind turbine 450. In some cases, two or more sensors 476 may be grouped based on a particular subsystem of wind turbine 450. In this way, a group of sensors 476 may be configured to monitor operating conditions of the particular subsystem.

In general, sensors 476 may each be configured to measure the value of a respective operating parameter of wind turbine 450 and then output data that indicates the measured value of the respective operating parameter over time. In this respect, the operating parameters of wind turbine 450 that are measured by sensors 476 may include vibrations, wind speed, wind direction, temperatures, pressures, rotational speeds, accelerations, power usages, fluid levels, runtimes, voltages and currents, magnetic fields, electric fields, location, positions of components, and power generation, among other examples. At least some of the aforementioned components of wind turbine 450 may include bearings and/or fluids, such as oils, hydraulic fluids, and/or other lubricating fluids, for which sensors 476 may be provided to measure operating conditions thereof. One of ordinary skill in the art will appreciate that these are but a few example operating conditions that sensors may be configured to measure. Additional or fewer sensors may be used depending on the specific type of wind turbine.

In practice, sensors 476 may each be configured to measure the value of a respective operating parameter continuously, periodically (e.g., based on a sampling frequency), and/or in response to some triggering event. In this respect, each sensor 476 may have a respective set of operating parameters that defines how the sensor performs its measurements, which may differ on a sensor-by-sensor basis (e.g., some sensors may sample based on a first frequency, while other sensors sample based on a second, different frequency). Similarly, sensors 476 may each be configured to output data that indicates the measured value of its respective operating parameter to control unit 472 and/or perhaps a local analytics device (if one is present) continuously, periodically, and/or in response to some triggering event.

Based on the foregoing, it will be appreciated that sensors 476 may take various different forms depending on the type of operating parameter being measured, among other factors. For instance, in some cases, a sensor 476 may take the form of a general-purpose sensing device that has been programmed to measure a particular type of operating parameter. In other cases, a sensor 476 may take the form of a special-purpose sensing device that has been specifically designed to measure a particular type of operating parameter (e.g., a biaxial vibration sensor, a temperature sensor, a barometric sensor, etc.). In still other cases, a sensor 476 may take the form of a special-purpose device that is not primarily designed to operate as a sensor but nevertheless has the capability to measure the value of an operating parameter as well. Sensors 476 may take other forms as well.

Control unit 472 is generally configured to (i) receive data from wind turbine 450's subsystems (e.g., sensor data, electricity-production data, meteorological data, etc.), (ii) store the data in data storage, (iii) access the stored data, and/or (iv) transmit the data to a variety of recipient systems, such as control center 408 of FIG. 4A and/or asset data platform 102 of FIG. 1, among other possibilities. In some embodiments, control unit 472 may include a wireless network interface that facilitates control unit 472 transmitting such data wirelessly.

As one example, control unit 472 may be configured to "push" data to asset data platform 102, directly or indirectly, either according to a schedule or in response to a triggering event (e.g., a certain amount of data has been collected). As another example, asset data platform 102 may be configured to "pull" data from control unit 472, directly or indirectly, either according to a schedule or in response to a triggering event. Other examples of asset data platform 102 obtaining operating data for a given wind turbine 450 are possible as well, including the possibility that asset data platform 102 may receive the data from wind turbine 450 indirectly via an intermediate entity (e.g., control center 408 of FIG. 4A).

Additionally, control unit 472 may be configured to receive data from any of wind turbine 450's subsystems, control center 408 of FIG. 4A, and/or asset data platform 102 of FIG. 1, and based on such data, cause an operation to occur at wind turbine 450. For instance, control unit 472 may receive a control instruction from asset data platform 102, directly or indirectly, that causes control unit 472 to modify the operation of rotor 454 via pitch system 462. Other examples are possible as well.

In some circumstances, it may also be desirable to perform certain data analytics operations locally at wind turbine 450, rather than relying on a central platform to perform data analytics operations. Indeed, performing data analytics operations locally at wind turbine 450 may reduce the need to transmit operating data to a centralized platform, which may reduce the cost and/or delay associated with performing data analytics operations at the central platform and potentially also increase the accuracy of certain data analytics operations, among other advantages.

In this respect, in some cases, the aforementioned on-board components of wind turbine 450 (e.g., control unit 472) may provide sufficient computing power to locally perform data analytics operations at wind turbine 450, in which case data storage may be provisioned with executable program instructions and associated program data for performing the data analytics operations. However, in other cases, the aforementioned on-board components of wind turbine 450 (e.g., control unit 472) may not provide sufficient computing power to locally perform certain data analytics operations at wind turbine 450. In such cases, wind turbine 450 may also optionally be equipped with a local analytics device, which may comprise a computing device that is capable of performing data analytics operations and other complex operations that go beyond the capabilities of wind turbine 450's other on-board components. In this way, the local analytics device may generally serve to expand the on-board capabilities of wind turbine 450. The details regarding an exemplary local analytics device can be found in U.S. patent application Ser. No. 14/963,207, which is herein incorporated by reference in its entirety.

Although wind turbine 300 is illustrated as a horizontal-axis, upwind wind turbine, this is for example and explanation purposes only. It should be understood that other wind turbine types, such as horizontal-axis, downwind wind turbines or vertical axis wind turbines, could be used instead or as well as the exemplary downwind turbine shown in FIG. 4B. Moreover, one of ordinary skill in the art will appreciate that FIGS. 4A-4B merely show one example of some aspects of a wind site and a wind turbine and that numerous other examples are also possible. For instance, the components of a wind turbine may include additional components not pictured, may have more or less of the pictured components, and/or the aforementioned components may be arranged and/or integrated in a different manner. Further, one of ordinary skill in the art will appreciate that two or more depicted components may be integrated together in whole or in part. Further yet, one of ordinary skill in the art will appreciate that at least some of the components of wind turbine 450 may be affixed or otherwise added to wind turbine 450 after it has been installed at a wind site.

V. EXAMPLE OPERATIONS

In operation, a wind turbine can experience rotor imbalance, such as when one of the wind turbine's blades has an irregularity relative to the other blades, when problems exist with the turbine's pitch system, and/or when rotor couplings cause a blade to behave irregularly. As one example, in a three-blade wind turbine, a subset of the blades (e.g., one blade) may have an irregular shape relative to the other blades, which may be the result of the manufacturing process of the blade or unintentional damage that occurred while the blade was in transit to its wind site, among other possibilities. As another example, a subset of the blades may have an irregular mass distribution relative to the other blades, which may be the result of the manufacturing process of the blade or ice accumulation or the like. In turn, rotor imbalance may lead to several negative consequences for a wind turbine.

For example, rotor imbalance at a wind turbine may ultimately lead to structural problems at the wind turbine that require additional maintenance and/or decrease the overall lifetime of the wind turbine. As another example, rotor imbalance at a wind turbine may reduce the turbine's productivity/efficiency (e.g., in terms of how much energy the wind turbine is able to capture from the wind). Rotor imbalance at a wind turbine may lead to other negative consequences as well.

In an effort to avoid (or at least minimize) rotor imbalance, the blades of a new wind turbine are typically selected such that the physical characteristics of the blades (e.g., mass distribution and shape) closely match one another. However, because the blades of a wind turbine are typically handmade, it can be difficult to select multiple (e.g., three or more) blades that sufficiently match one another such that the blades do not cause rotor imbalance. Further, the physical characteristics of one or more of the wind turbine's blades can be unintentionally altered while the blades are being transported to the wind turbine's installation location at a wind site and/or can change over time as the wind turbine is operating (e.g., due to weather conditions or the like), any of which may introduce a physical irregularity at one blade relative to the other blades that in turn causes rotor imbalance.

In view of the foregoing, there is a need for technology that is capable of detecting a rotor imbalance at a wind turbine, so that the rotor imbalance can be remedied and the negative consequences described above can be avoided. However, existing technology for detecting a rotor imbalance at a wind turbine has significant drawbacks. For instance, some current approaches involve using a camera to capture footage of a wind turbine's rotor and/or individual blades and then reviewing the captured footage for evidence of rotor imbalance. Some other current approaches involve retrofitting a wind turbine with specialized sensors (e.g., "strain gauge" sensors, acoustic emission sensors, etc.) after the wind turbine has been assembled and installed at a wind site and then evaluating measurements of these specialized sensors as a means of detecting rotor imbalance. There are additional current approaches as well. However, current approaches are time consuming, costly, prone to error, and reliant on post-assembly installation of specialized sensors and/or other equipment.

To help address these and other problems, the asset data platform disclosed herein is configured to perform an improved technological process for detecting rotor imbalance at a wind turbine using vibration data captured by a wind turbine's preinstalled multi-dimensional sensor, either alone or in combination with other data related to the operation of the wind turbine (e.g., other operating data, vibration data from one or more of the wind turbine's other preinstalled sensors, weather data, etc.). At a high level, this process may involve (i) a "training" phase during which a model for detecting rotor imbalance (e.g., a predictive model or a set of rules) is defined based on historical vibration data for wind turbines and perhaps other data related to the operation of the wind turbine as well (e.g., other types of historical operating data, historical environmental data, historical maintenance data, etc.), and (ii) an "alerting" phase during which the defined model is applied to vibration data (and perhaps other data) for a given wind turbine from a reference time to determine whether the wind turbine appears to have a rotor imbalance issue. Each of these phases is described in further detail below.

Example functions that may be carried out by a data analytics platform to define and execute a model for detecting rotor imbalance in wind turbines will now be discussed in detail. For purposes of illustration only, the example functions are described in the context of example network configuration 100 of FIG. 1, where asset data platform 102 is a data analytics platform configured to define and execute a model for detecting rotor imbalance based on vibration data captured by wind turbines' preinstalled multi-dimensional sensors.

To help describe some of these operations, flow diagrams may also be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

Figure 5:
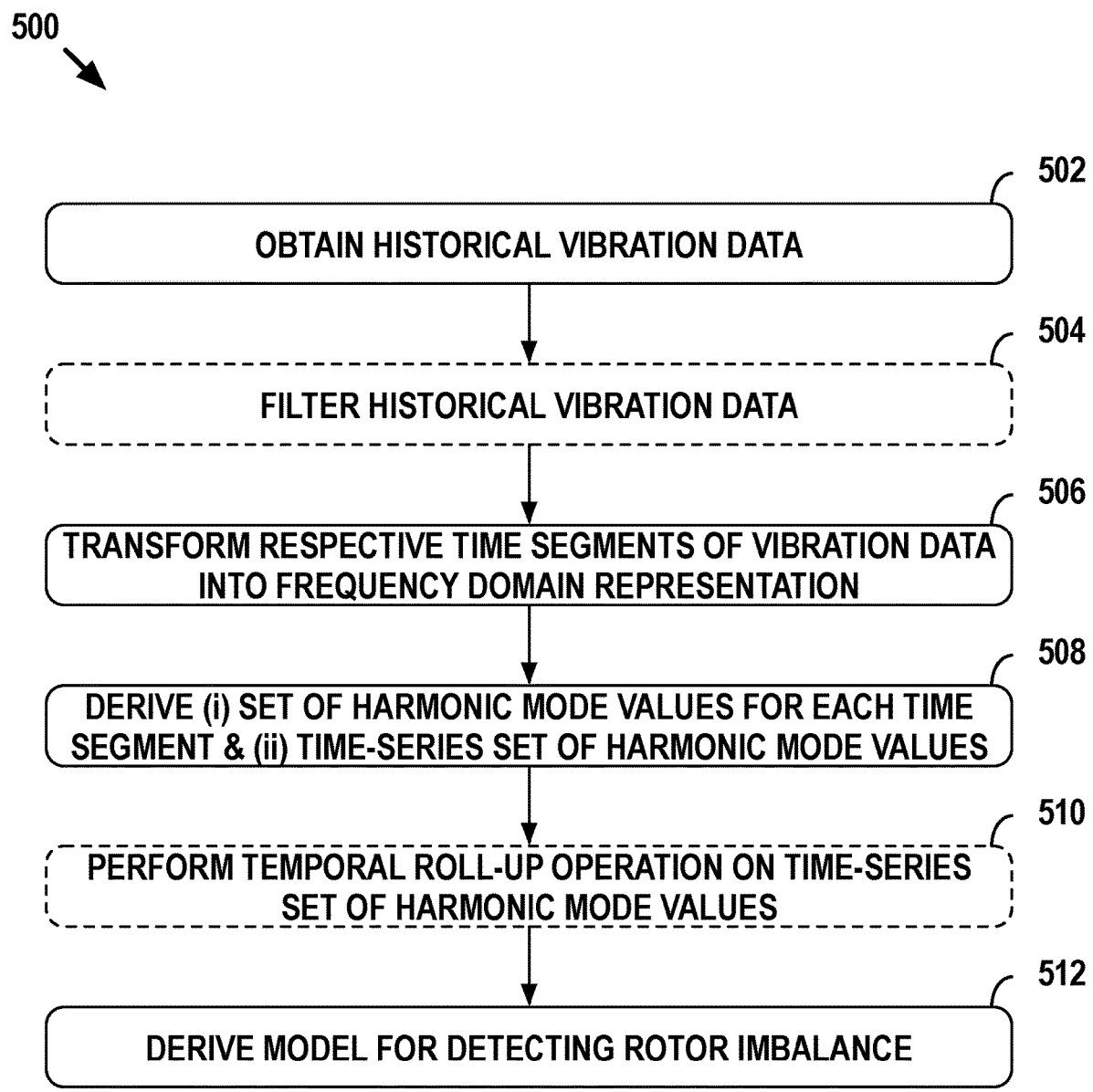
FIG. 5 is a flow diagram for an example training phase to define a model for detecting rotor imbalance in wind turbines.

With reference now to flow diagram 500 of FIG. 5, asset data platform 102 may be configured to execute an example "training" phase to define a model for detecting rotor imbalance in wind turbines that generally involves (i) at block 502, obtaining historical vibration data for a plurality of wind turbines, (ii) at block 504, optionally filtering each wind turbine's respective set of historical vibration data to exclude vibration data corresponding to abnormal-turbine operation, (iii) at block 506, for each wind turbine, transforming each of a plurality of time segments of the historical vibration data into a frequency domain representation, (iv) at block 508, for each of the plurality of time segments, deriving a set of "harmonic mode" values from the frequency domain representation of the historical vibration data, thereby deriving a time-series set of "harmonic mode" values, (v) at block 510, optionally performing a temporal "roll-up" operation on the time-series set of "harmonic mode" values, and (vi) at block 512, deriving a model for detecting rotor imbalance based on the respective time-series sets of "harmonic mode" values for the plurality of wind turbines. Each of these functions will now be discussed in further detail.

At block 502, asset data platform 102 may be configured to obtain historical vibration data for a plurality of wind turbines. In practice, asset data platform 102 may perform this function in a variety of manners.

As one possibility, asset data platform 102 may have previously received respective sets of historical time-series vibration data captured by multi-dimensional sensors at a plurality of wind turbines and may then obtain that data from data storage or the like. As one possibility, asset data platform 102 may obtain respective sets of historical time-series vibration data from internal data storage. As another possibility, asset data platform 102 may obtain respective sets of historical time-series vibration data from an external data source that previously received the data, such as operating data source 104B of FIG. 1.

In any case, each wind turbine's historical time-series vibration data may be indicative of vibrations at the wind turbine in multiple, different dimensions (e.g., side-to-side vibrations corresponding to an x-dimension and fore-to-aft vibrations corresponding to a y-dimension). In practice, this historical time-series vibration data may take a variety of forms, such as a time-series of periodic "bursts" of vibration data captured at a high sample rate (e.g., 500-second windows of vibration data that includes 100 samples per second). In some cases, the historical time-series vibration data may have a minimum sampling rate (e.g., 10 Hz or some other sub-second sampling rate).

Figure 6:
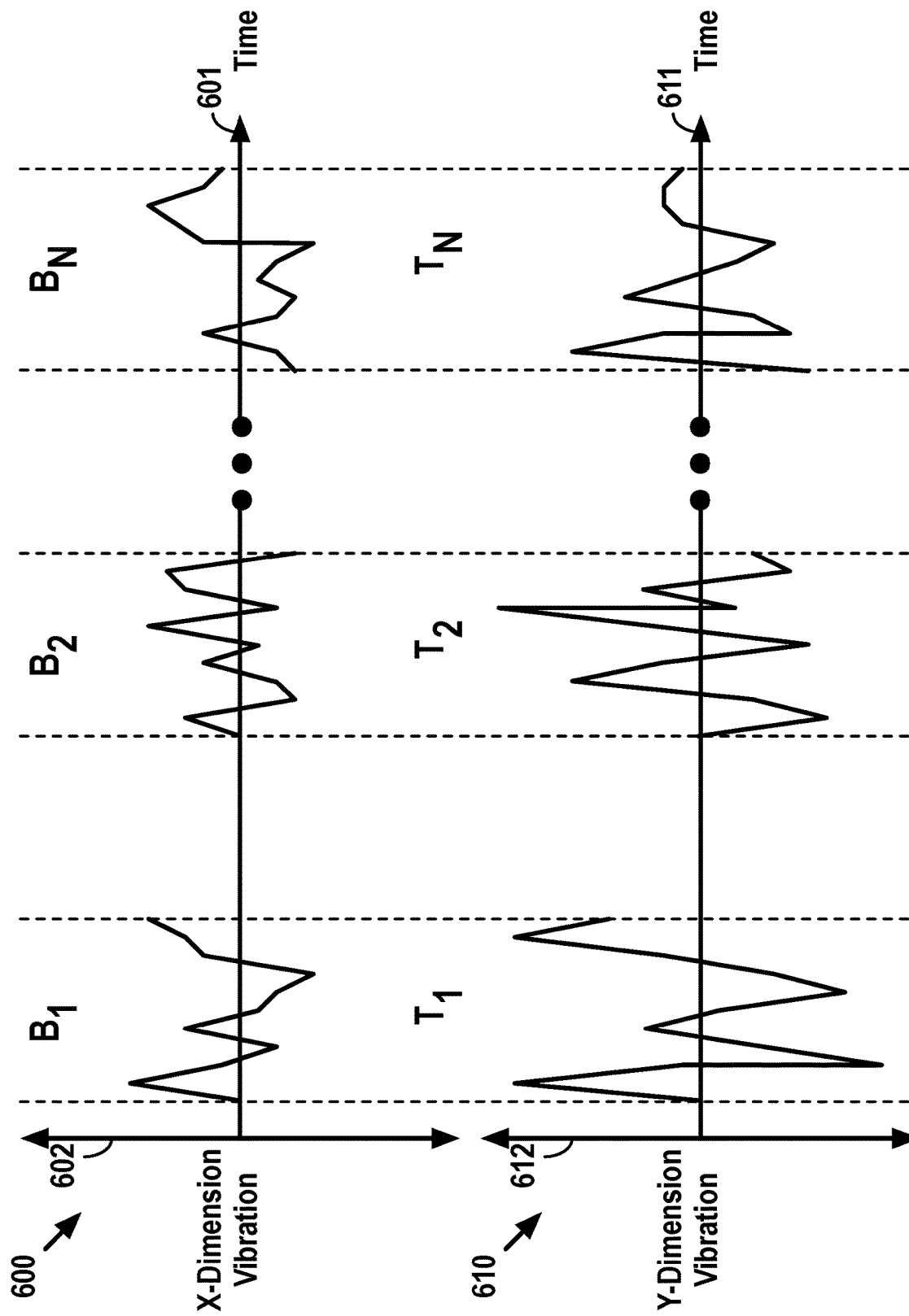
FIG. 6 provides a conceptual illustration of a given wind turbine's set of historical time-series vibration data from the given wind turbine's multi-dimensional sensor.

To illustrate, FIG. 6 provides a conceptual illustration of a given wind turbine's set of historical time-series vibration data from the given wind turbine's multi-dimensional sensor that was obtained by asset data platform 102. As shown, this conceptual illustration includes a data plot 600 of historical vibration measurements from the multi-dimensional sensor's x-dimension and a data plot 610 of historical vibration measurements from the multi-dimensional sensor's y-dimension. Each data plot 600 and 610 includes a respective horizontal axis 601 and 611 corresponding to time and a respective vertical axis 602 and 612 corresponding to vibration magnitude (e.g., in units of acceleration or power). In this example, the given wind turbine's set of historical time-series vibration data takes the form of a plurality (i.e., N) "bursts" of vibration data captured at a high sample rate, where each "burst" corresponds to a given window of time.

Returning to FIG. 5, at block 504, asset data platform 102 may be configured to optionally filter each wind turbine's respective set of historical vibration data to exclude vibration data corresponding to times when any wind turbine may have been operating abnormally for a reason other than rotor imbalance. In other words, asset data platform 102 may be configured to preprocess the historical vibration data so that asset data platform 102 defines the model based on historical vibration data that corresponds to the "normal" operation of the set of wind turbines. In practice, asset data platform 102 may filter each wind turbine's respective set of historical vibration data in a variety of manners.

As one possibility, asset data platform 102 may be configured to filter historical vibration data for a given wind turbine based on other data related to the historical operation of the given wind turbine that is indicative of a time when the given wind turbine was likely operating abnormally. In some instances, this other data related to the historical operation of the given wind turbine may be directly indicative of a time when the given wind turbine was likely operating abnormally (e.g., maintenance data indicating that the given wind turbine was under repair during a given period of time), or it may be indirectly indicative of a time when the given wind turbine was likely operating abnormally, such that asset data platform 102 infers from the nature of the data that the given wind turbine was likely operating abnormally. In any case, this other data related to the historical operation of the given wind turbine may take a variety of forms.

For example, historical energy production data may indicate that the given wind turbine was inactive (e.g., not generating electricity) during a certain period of time, which may cause asset data platform 102 to exclude any historical vibration data for the given wind turbine from that period of time. Similarly, as another example, historical blade-pitch data may indicate that the given wind turbine's blades were at a pitch angle during a given period of time that typically corresponds to an inactive wind turbine (e.g., an angle outside of the range of −2 to 5 degrees for a wind turbine with a pitch-angle range of −2 to 90 degrees), which may cause asset data platform 102 to exclude any historical vibration data for the given wind turbine from that period of time. As yet another example, historical weather data for the given wind turbine's wind site may indicate that the wind speed during a particular period of time exceeded a threshold at which wind turbines at the wind site were allowed to operate, which may cause asset data platform 102 to exclude any historical vibration data for the given wind turbine (as well as for any other wind turbine at the wind site) from that period of time. Numerous other examples are possible as well.

In practice, asset data platform 102 may be configured to filter historical vibration data for a given wind turbine based on one or more different types of data related to the historical operation of the given wind turbine that are indicative of a time when the given wind turbine was likely operating abnormally. For instance, asset data platform 102 may consider two or more of the above-mentioned example-types of data. In some instances, asset data platform 102 may consider one or more first types of data for filtering vibration data for a first wind turbine and one or more different types of data for filtering vibration data for a second wind turbine. Other examples are also possible.

At block 506, asset data platform 102 may be configured to, for each wind turbine, transform each of a plurality of time segments of the historical vibration data into a frequency-domain representation. In example implementations, this function may involve asset data platform 102, on a wind-turbine-by-wind-turbine basis, (i) breaking the given wind turbine's set of historical time-series vibration data into a plurality of time segments and (ii) converting each respective time segment into the frequency domain. This may be accomplished in a variety of manners.

As one possible approach, asset data platform 102 may take each respective "burst" within the historical time-series vibration data for a given wind turbine and then perform a frequency-domain transform (e.g., a Fourier, Laplace, Z, or Wavelet transform) of the particular "burst" in each dimension measured by the given wind turbine's multi-dimensional sensor (e.g., fore-to-aft and side-to-side). This function results in a representation of the particular "burst" in the frequency domain (for each dimension) that includes a set of peaks spaced out at different frequency ranges corresponding to different "harmonic modes" (e.g., integer multiples of the given wind turbine's rotor frequency, such as 1P, 3P, etc.).

Figure 7:
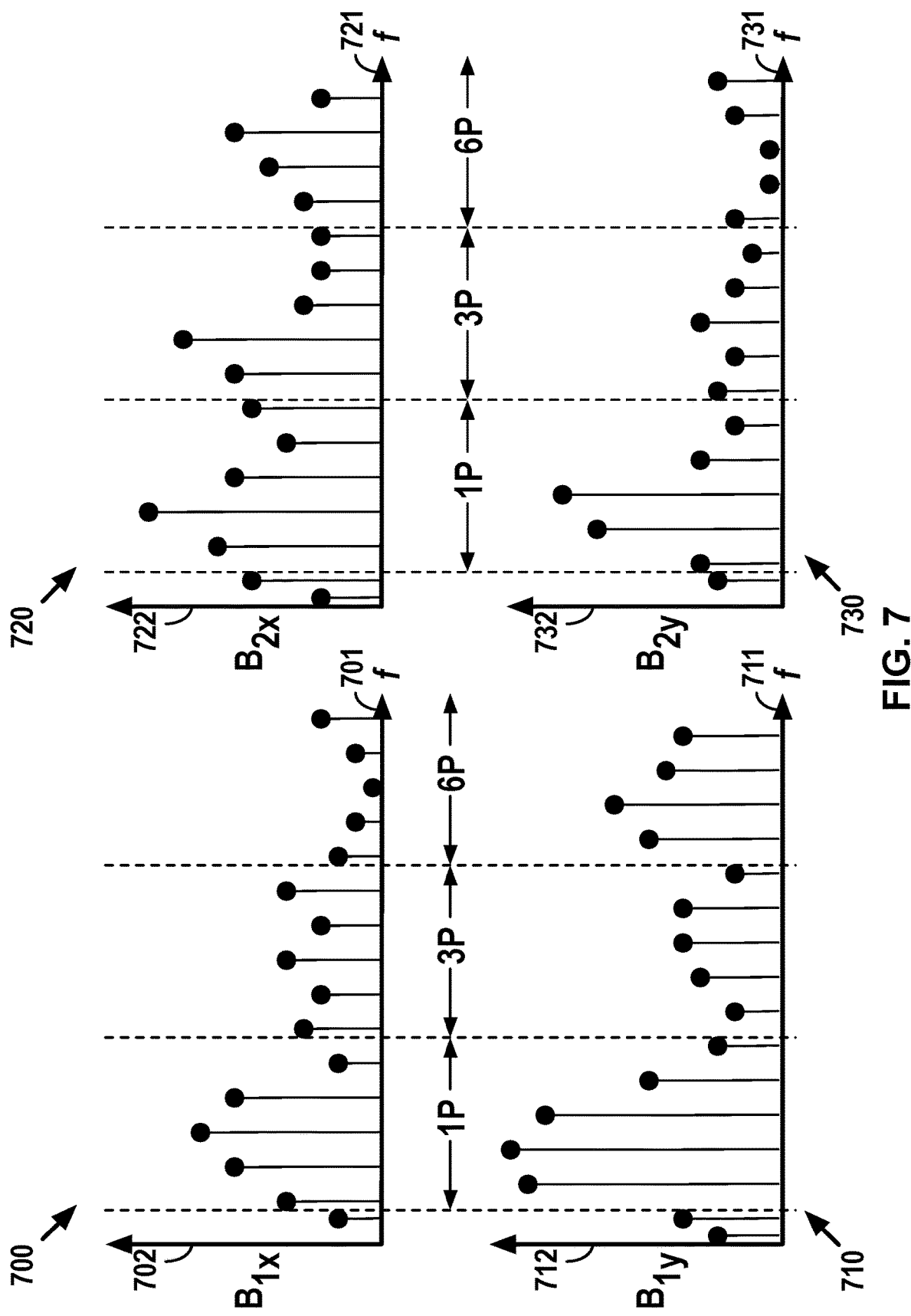
FIG. 7 provides a conceptual illustration of two bursts of a set of historical time-series vibration data transformed into a frequency-domain representation.

To illustrate, FIG. 7 provides a conceptual illustration of two bursts of the set of historical time-series vibration data from FIG. 6 transformed into a frequency-domain representation. In particular, data plots 700 and 710 depict a Fourier representation of the x-dimension vibration data (data plot 700) and y-dimension vibration data (data plot 710) of burst $B_1$ from FIG. 6. Similarly, data plots 720 and 730 depict a Fourier representation of the x-dimension vibration data (data plot 720) and y-dimension vibration data (data plot 730) of burst $B_2$ from FIG. 6. In practice, asset data platform 102 computes a similar Fourier transform for each of the N bursts of vibration data for the given wind turbine. Each data plot 700, 710, 720, and 730 includes a respective horizontal axis 701, 711, 721, and 731 corresponding to frequency and a respective vertical axis 702, 712, 722, and 732 corresponding to vibration magnitude (e.g., Fourier coefficient value). As shown in FIG. 7, data plots 700, 710, 720, and 730 are divided into multiple frequency-ranges of interest (e.g., a 1P, 3P, and 6P range), each of which corresponds to a different harmonic mode (e.g., integer multiples of the given wind turbine's rotor frequency). Notably, one of ordinary skill in the art will appreciate that FIG. 7 (as well as other figures discussed herein) are provided for purposes of example and explanation only and are not necessarily drawn to scale.

Returning to FIG. 5, at block 508, asset data platform 102 may be configured to, for each of the plurality of time segments for each wind turbine, derive a set of "harmonic mode" values from the frequency domain representation of the historical vibration data, thereby deriving a time-series set of "harmonic mode" values for each wind turbine. This function may take a variety of forms.

As one possible approach, asset data platform 102 may aggregate frequency-domain values for each respective time segment (and for each dimension) within one or more frequency-ranges of interest. For instance, once in the frequency domain, asset data platform 102 may apply, on a burst-by-burst basis, a statistical aggregation (e.g., averaging, identifying the median value, etc.) to the frequency-domain coefficient values (e.g., Fourier coefficient values) within each of one or more respective frequency ranges (and for each dimension) to derive a set of "harmonic mode" values for the particular "burst" (e.g., a $1P_x$ value, $3P_x$ value, etc. for the side-to-side dimension and a $1P_y$ value, $3P_y$ value, etc. for the fore-to-aft dimension).

To illustrate, returning to FIG. 7, asset data platform 102 may apply a statistical aggregation to (i) each set of peaks that fall within the 1P range of data plot 700 to derive an aggregated 1P value for burst $B_1$ in the x-dimension, and (ii) each set of peaks that fall within the 3P range of data plot 700 to derive an aggregated 3P value for burst $B_1$ in the x-dimension. In this example, asset data platform 102 does not perform the aggregation function for the 6P range because asset data platform 102 has not designated the 6P range to be a frequency-range of interest. However, in some implementations, asset data platform 102 may indeed designate the 6P range, and perhaps other frequency ranges, as a frequency-range of interest. In any case, asset data platform 102 performs similar aggregations to the other data plots 710, 720, and 730.

Asset data platform 102 carrying out the foregoing function for each respective "burst" within a given wind turbine's historical time-series vibration data may result in a time-series set of "harmonic mode" values for the given wind turbine, where each respective time point in the time-series set of "harmonic mode" values comprises a multivariate vector that includes the derived set of "harmonic mode" values for the respective "burst" associated with that time point. Viewed another way, this function may result in multiple, different time-series sets for the given wind turbine that each correspond to a particular type of "harmonic mode" value, such as a first time-series set of $1P_x$ values, a second time-series set of $1P_y$ values, a third time-series set of $3P_x$ values, a fourth time-series set of $3P_y$ values, etc.

Figure 8:
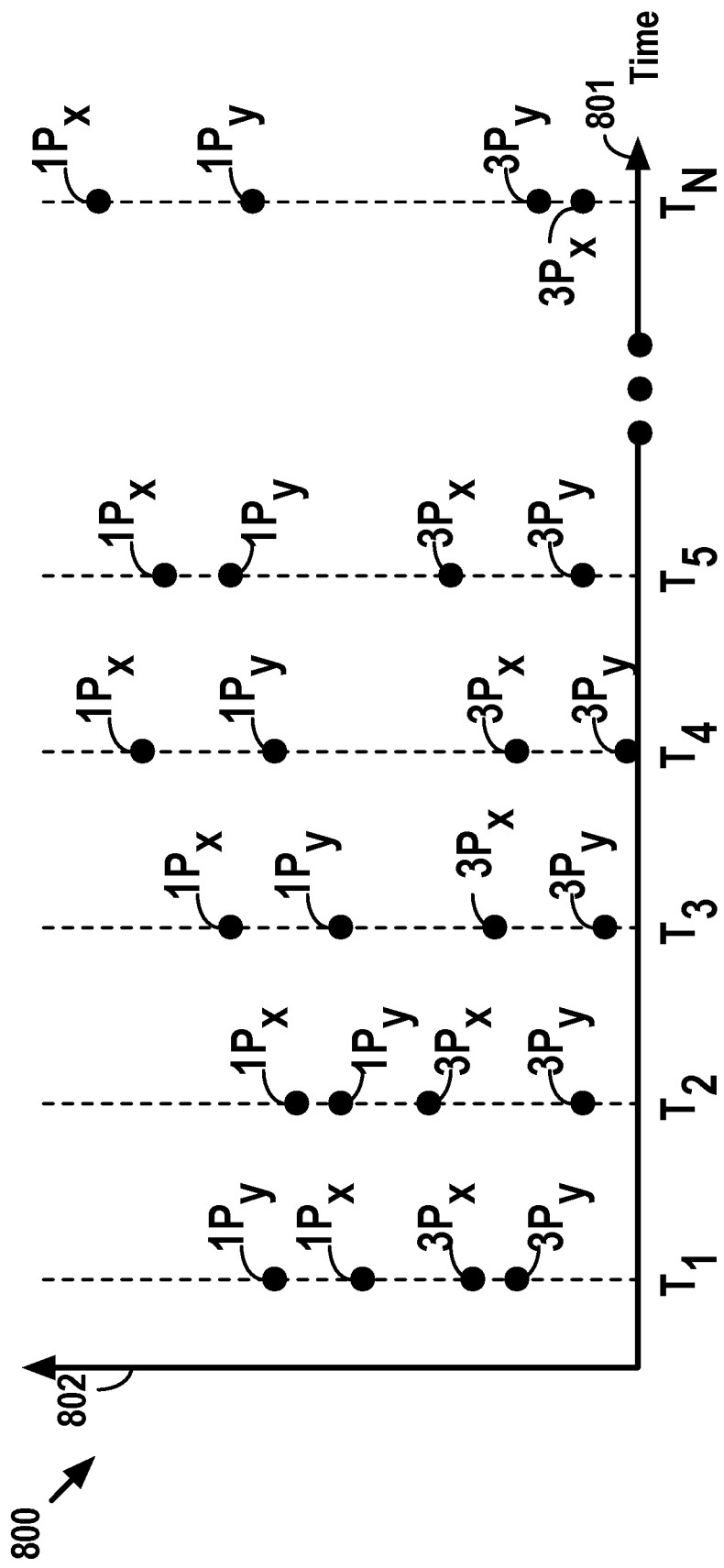
FIG. 8 provides a conceptual illustration of an example time-series set of harmonic mode values for a given wind turbine.

To illustrate, FIG. 8 provides a conceptual illustration of an example time-series set of "harmonic mode" values for the given wind turbine that was derived from the frequency-domain representation of the historical vibration data illustrated in FIG. 7. As shown, data plot 800 includes a horizontal axis 801 corresponding to time, a vertical axis 802 corresponding to aggregation magnitude, and a representation of a multivariate vector at each time point that includes the derived set of "harmonic mode" values (e.g., $1P_x$, $1P_y$, $3P_x$, and $3P_y$ aggregated values) for the respective "burst" associated with that time point.

Returning to FIG. 5, at block 510, asset data platform 102 may be configured to optionally perform a temporal "roll-up" operation on the time-series set of "harmonic mode" values for each wind turbine, which may help reduce noise across the time segments (e.g., "bursts"). This function may take various forms.

As one possible implementation of this function, asset data platform 102 may perform a temporal "roll-up" operation on the time-series set of "harmonic mode" values for the given wind turbine using a lookback window approach. One implementation of a lookback window approach may involve asset data platform 102 performing the following operations for each of a plurality of reference time points in the given wind turbine's time-series set of "harmonic mode" values: (i) obtaining the "harmonic mode" values for time points within a predetermined window of time preceding the reference time point (e.g., a two-week lookback window), (ii) applying a statistical aggregation (e.g., averaging, identifying the median value, etc.) to the obtained "harmonic mode" values for the time points within the predetermined window of time preceding the reference time point as well as the "harmonic mode" values for the reference time point, and (iii) assigning the resulting, rolled-up "harmonic mode" values to the reference time point (e.g., a rolled-up $1P_x$ value, $1P_y$ value, $3P_x$ value, $3P_y$ value, etc.). Carrying out these operations for each of a plurality of reference time points in the time-series set of "harmonic mode" values for a given wind turbine may then result in a rolled-up, time-series set of "harmonic mode" values for the given wind turbine.

To illustrate, returning to FIG. 8, asset data platform 102 may perform a temporal "roll-up" operation for, as one example, reference time point $T_5$ by performing a five-time-point lookback that involves (i) obtaining the "harmonic mode" values (e.g., $1P_x$, $1P_y$, $3P_x$, and $3P_y$ values) for time points $T_1$-$T_4$, (ii) applying a statistical aggregation (e.g., averaging) those "harmonic mode" values as well as the "harmonic mode" values for time point $T_5$, and (iii) assigning the resulting, rolled-up "harmonic mode" values to reference time point $T_5$. In practice, asset data platform 102 may perform a similar temporal "roll-up" operation for each time point depicted in FIG. 8.

Other types and manners of performing a temporal "roll-up" are also possible. For example, instead of a "lookback window approach," asset data platform 102 may perform a "look-forward window approach" that involves the "harmonic mode" values for time points within a predetermined window of time after the reference time point. As another example, instead of a "lookback window approach," asset data platform 102 could perform a "sliding window approach" that involves the "harmonic mode" values for time points within a predetermined window of time that straddles the reference time point (i.e., with some portion of the window preceding and some portion after the reference time point).

Returning to FIG. 5, at block 512, asset data platform 102 may be configured to derive a model for detecting rotor imbalance based on the respective time-series sets of "harmonic mode" values for the plurality of wind turbines. In other words, asset data platform 102 may be configured to evaluate the time-series sets of "harmonic mode" values for the plurality of wind turbines (either as initially derived or in rolled-up form) and thereby derive a model for determining whether a wind turbine's "harmonic mode" values are indicative of a rotor imbalance issue. In this respect, it is expected that the "harmonic mode" values at or near the rotor frequency (e.g., the $1P_x$ and $1P_y$ values) for the wind turbines will be most indicative of whether the turbines have a rotor imbalance issue, but it is possible that other "harmonic mode" values may be correlated to rotor imbalance as well. In practice, the model for detecting rotor imbalance may take a variety of forms, and asset data platform 102 may derive this model in a variety of manners.

As one possibility, the model for detecting rotor imbalance may take the form of a predictive model that is configured to (i) receive one or more sets of "harmonic mode" values that have been derived based on multi-dimensional vibration data captured at a given wind turbine and (ii) output an indication of whether the given wind turbine is predicted to have a rotor imbalance issue. In this respect, asset data platform 102 may derive such a predictive model by applying a machine-learning technique (e.g., a supervised or unsupervised machine-learning technique) to training data that includes time-series sets of "harmonic mode" values for a plurality of wind turbines (perhaps in rolled-up form) that have been derived in the manner described at blocks 502-510, perhaps along with labels indicating times when the plurality of wind turbines were known to have a rotor imbalance issue. In example implementations, the machine-learning technique may involve utilizing one or more of logistic regression, support vector machine, random forest, and/or a neural network, among other possibilities.

As another possibility, the model for detecting rotor imbalance may take the form of a predictive model that is configured to (i) receive one or more sets of "harmonic mode" values that have been derived based on multi-dimensional vibration data captured at a given wind turbine along with other types of data related to the operation of the given wind turbine (e.g., rotor frequency, windspeed, ambient temperature, etc.) and (ii) output an indication of whether the given wind turbine is predicted to have a rotor imbalance issue. In this respect, asset data platform 102 may derive such a predictive model by applying a machine-learning technique (e.g., a supervised or unsupervised machine-learning technique) to training data that includes time-series sets of "harmonic mode" values for a plurality of wind turbines (perhaps in rolled-up form) that have been derived in the manner described at blocks 502-510 and historical data related to the operation of the plurality of wind turbines, perhaps along with labels indicating times when the plurality of wind turbines were known to have a rotor imbalance issue. In example implementations, the machine-learning technique may involve utilizing one or more of logistic regression, support vector machine, random forest, and/or a neural network, among other possibilities.

In practice, the historical data related to the operation of the plurality of wind turbines may take a variety of forms, such as various types of historical operating data other than vibration data from the pre-installed multi-dimensional sensor (e.g., rotor RPM data, power-generation data, turbine status data, etc.), historical environmental data (e.g., wind-speed data, air-density data, precipitation data, temperature data, etc.), historical maintenance data (data indicative of turbine repairs, data indicative of rotor-imbalance-related maintenance events, etc.), etc.

As yet another possibility, the model for detecting rotor imbalance may take the form of a rules-based model that is configured to (i) receive one or more sets of "harmonic mode" values that have been derived based on multi-dimensional vibration data captured at a given wind turbine and perhaps also historical data related to the operation of the given wind turbine (e.g., rotor frequency, windspeed, ambient temperature, etc.) and (ii) output an indication of whether a rotor imbalance issue has been detected at the given wind turbine. In this respect, asset data platform 102 may derive such a rules-based model by identifying values or ranges of values (and/or other features indicative of rotor behavior) corresponding to wind turbines exhibiting "balanced" rotor behavior and then in turn identifying one or more deviations from these values or ranges of values (and/or other features) that correspond to wind turbines exhibiting a rotor imbalance issue, which may then be embodied into a set of rules that comprises the rules-based model for detecting rotor imbalance.

For instance, one possible example of a rules-based model may be configured to detect a rotor imbalance at a given wind turbine when the average value of its "harmonic mode" values for a given rotor frequency (e.g., its $1P_x$ and $1P_y$ values) over a one-week period of time exceeds a first threshold or the standard deviation of its "harmonic mode" values for a given rotor frequency (e.g., its $1P_x$ and $1P_y$ values) over a two-week period of time exceeds a second threshold. Another example of a rules-based model may be configured to detect a rotor imbalance at a given wind turbine when its "harmonic mode" values for a given rotor frequency (e.g., its $1P_x$ and $1P_y$ values) exceed a threshold, such as a threshold relative to the median value of "harmonic mode" values for the given rotor frequency for multiple wind turbines for that given time (e.g., 3 standard deviations, 0.03 m/s$^2$, etc.). Other manners of deriving a rules-based model for detecting rotor imbalance also exist.

In some instances, asset data platform 102 may derive the model for detecting rotor imbalance based, at least in part, on comparing respective time-series sets of "harmonic mode" values of two or more neighboring wind turbines, such as two or more wind turbines that are geographically located proximate to one another and/or have experienced substantially similar meteorlogical conditions. Other examples are also possible.

As discussed above, depending on the nature of the model for detecting rotor imbalance, the model may output an indication of whether the given wind turbine (i) is predicted to have a rotor imbalance issue or (ii) has been detected to have a rotor imbalance issue. In practice, this indication may take a variety of forms.

As one possibility, the indication may take the form of a metric reflecting a likelihood that the given wind turbine has a rotor imbalance issue. For example, this metric may take the form of a probability metric reflecting a predicted probability of a rotor imbalance issue existing at the given wind turbine that may be represented on a scale of either 0 to 100 or 0.0 to 1.0. However, the metric reflecting a likelihood that the given wind turbine has a rotor imbalance issue may take various other forms as well.

As another possibility, the indication may take the form of a binary indication of whether or not the model predicts or determines that a rotor imbalance issue exists at the given wind turbine, such as an indicator that has a first value if the model predicts or determines that a rotor imbalance issue does not exist (e.g., a value of "0" or "No") and a second value if the model predicts or determines that a rotor imbalance issue does exist (e.g., a value of "1" or "Yes"). Other forms of the model's outputted indication are also possible.

After asset data platform 102 derives a model for determining whether wind-turbine multi-dimensional vibration data is indicative of a rotor imbalance issue, asset data platform 102 is configured to proceed to an "alerting" phase during which asset data platform 102 generally determines whether vibration data from a given wind turbine for a particular reference time (i.e., "reference vibration data") is indicative of a rotor imbalance issue at the given wind turbine. In practice, asset data platform 102 may run this "alerting" phase for multiple wind turbines at a time.

Figure 9:
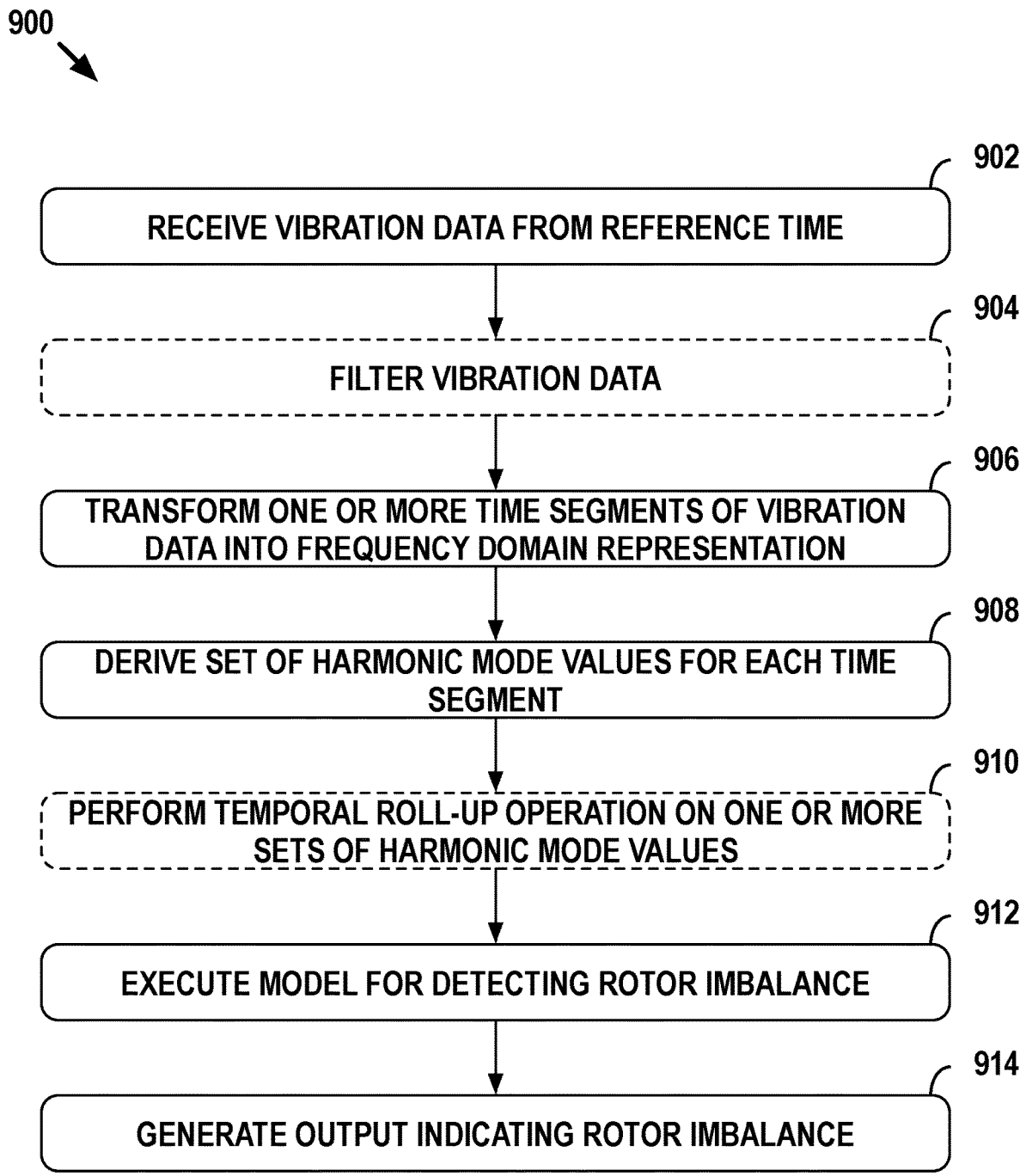
FIG. 9 is a flow diagram for an example alerting phase to detect rotor imbalance in wind turbines.

With reference now to flow diagram 900 of FIG. 9, asset data platform 102 may be configured to execute an example "alerting" phase to detect rotor imbalance in wind turbines that generally involves (i) at block 902, receiving vibration data from a given wind turbine from a reference time, (ii) at block 904, optionally filtering the given wind turbine's vibration data to exclude vibration data corresponding to abnormal-turbine operation, (iii) at block 906, transforming one or more time segments of vibration data into a frequency domain representation, (iv) at block 908, for each of the one or more time segments, deriving a set of "harmonic mode" values from the frequency domain representation of the vibration data, (v) at block 910, optionally performing a temporal "roll-up" operation on the one or more sets of "harmonic mode" values, (vi) at block 912, executing a model for detecting rotor imbalance based on the one or more sets of "harmonic mode" values for the given wind turbine, and (vii) at block 914, generating an output (e.g., an alert or other notification) indicating a rotor imbalance based on the output of executed model. Each of these functions will now be discussed in further detail.

At block 902, asset data platform 102 may be configured to receive vibration data from a given wind turbine from a reference time. For instance, asset data platform 102 may receive reference time-series vibration data captured by a preinstalled multi-dimensional sensor at the given wind turbine that corresponds to fore-to-aft and side-to-side movements of the given wind turbine. In operation, this reference vibration data may take a variety of forms, such as a time-series set of one or more "bursts" of vibration data captured at a high sample rate (e.g., 500-second windows of vibration data that includes 100 samples per second), which may be the same or a different sample rate used during the "training" phase.

In practice, asset data platform 102 receives the reference time-series vibration data that is from a particular reference time, such as a particular point in time or period of time in the past. For example, asset data platform 102 may periodically receive a batch of time-series vibration data corresponding to the given wind turbine's operation (or the whole park's operation) for a particular period of time (e.g., the past 10 minutes, the past 24 hours, etc.). In some implementations, asset data platform 102 may receive this reference vibration data in real-time, near real-time, or otherwise shortly after the given wind turbine's multi-dimensional sensor captures the data.

At block 904, asset data platform 102 may be configured to optionally filter the given wind turbine's vibration data to exclude vibration data corresponding to times when the given wind turbine may have been operating abnormally for a reason other than rotor imbalance (or asset data platform 102 may decline to execute the "alerting" phase for the given wind turbine altogether). To that end, asset data platform 102 may perform this function based on a variety of other data related to the operation of the given wind turbine, such as other operating data (e.g., current and/or most recent energy production data) and/or environmental data (e.g., current and/or most recent weather data for the given wind turbine's wind site), among other possibilities.

In example implementations, this optional function may be included only when a comparable function was included during the "training" phase, while in other implementations, this optional function may be included or excluded regardless of whether a comparable function was included or excluded during the "training" phase.

At block 906, asset data platform 102 may be configured to transform one or more time segments of the given wind turbine's vibration data into a frequency domain representation. This function may be performed in a variety of manners.

In example implementations, when the given wind turbine's vibration data includes multiple time segments, this function may involve asset data platform 102 (i) breaking the given wind turbine's respective set of historical time-series vibration data into a plurality of time segments and (ii) converting each respective time segment into the frequency domain (e.g., using a Fourier, Laplace, Z, or Wavelet transform). This may be accomplished in a variety of manners.

As one possible approach, asset data platform 102 may take each respective "burst" within the given wind turbine's time-series vibration data and then perform a Fourier transform to the particular "burst" in each dimension measured by the given wind turbine's multi-dimensional sensor (e.g., fore-to-aft and side-to-side). Likewise, in instances when the given wind turbine's vibration data includes one time segment (e.g., a single "burst"), asset data platform 102 may perform a frequency-domain transform of the single "burst" in each dimension measured by the given wind turbine's multi-dimensional sensor (e.g., fore-to-aft and side-to-side). In any case, as in the "training" phase, this function results in a representation of each particular "burst" in the frequency domain (for each dimension) that includes a set of peaks spaced out at different frequency ranges corresponding to different "harmonic modes" (e.g., integer multiples of the given wind turbine's rotor frequency, such as 1P, 3P, etc.).

At block 908, asset data platform 102 may be configured to, for each of the one or more time segments, derive a set of "harmonic mode" values from the frequency domain representation of the vibration data. This function may take a variety of forms.

As one possible approach, asset data platform 102 may aggregate frequency-domain values for each of the one or more respective time segments (for each dimension) within one or more frequency-ranges of interest. For instance, once in the frequency domain, asset data platform 102 may apply a statistical aggregation (which may be the same or different from the aggregation function used during the "training" phase) to the frequency-domain coefficient values (e.g., Fourier coefficient values) of the particular "burst" within each respective frequency range and for each dimension to derive a set of "harmonic mode" values for the particular "burst" (e.g., a $1P_x$ value, $3P_x$ value, etc. for the side-to-side dimension and a $1P_y$ value, $3P_y$ value, etc. for the fore-to-aft dimension).

Asset data platform 102 carrying out the foregoing function for at least one "burst" within the given wind turbine's reference time-series vibration data may result in at least one corresponding set of "harmonic mode" values for the given wind turbine at a respective time point, where the respective time point comprises a multivariate vector that includes the derived set of "harmonic mode" values for the at least one "burst" associated with that time point.

At block 910, asset data platform 102 may be configured to optionally perform a temporal "roll-up" operation on the one or more sets of "harmonic mode" values, which may help reduce noise across the one or more time segments (e.g., "bursts"). This function may take various forms.

In example implementations, asset data platform 102 may perform the temporal "roll-up" function in line with the discussion from block 510 of FIG. 5 but using one or more previously-derived sets of "harmonic mode" values for time segments (e.g., "bursts") of reference vibration data that precede (or surround) the time segment from the one or more time segments that includes the reference time point. Other examples are also possible.

At block 912, asset data platform 102 may be configured to execute a model for detecting rotor imbalance based on the one or more sets of "harmonic mode" values for the given wind turbine. For instance, asset data platform 102 may be configured to execute the model defined in the "training" phase (e.g., at block 512 of FIG. 5) using the one or more sets of "harmonic mode" values (either as initially derived or in rolled-up form) that were derived based on the given wind turbine's reference time-series vibration data, which results in an indication of whether the given wind turbine's multi-dimensional vibration data is indicative of a rotor imbalance issue.

As noted above, in some implementations, executing the model for detecting rotor imbalance may take into account both (i) one or more sets of "harmonic mode" values derived based on the given wind turbine's reference time-series vibration data and (ii) other data that may be indicative of a rotor imbalance issue, such as other operating data for the given wind turbine, environmental data for the given wind turbine, and/or other data derived therefrom.

Notably, the model disclosed herein for detecting rotor imbalance is advantageous over other approaches for detecting rotor imbalance at least because, unlike these other approaches, the model here is based on vibration data from a sensor that wind turbines are already equipped with when originally assembled and installed at a wind site. As such, the wind turbines do not need additional sensors and/or equipment to be installed in order for the model to detect rotor imbalance.

At block 914, asset data platform 102 may be configured to generate an output (e.g., an alert or other notification) indicating a rotor imbalance based on the output of the executed model. For instance, if the model outputs an indication that there does appear to be a rotor imbalance issue at the given wind turbine, asset data platform 102 may generate a visual and/or audible alert (or other notification) that identifies the existence of a rotor imbalance issue and provide the alert (or other notification) to an individual responsible for overseeing the operation of the given wind turbine, such as by outputting a representation of the alert at a work station, mobile device, or the like (e.g., by sending more or more signals to client station 106A or third-party platform 106B).

As one example, asset data platform 102 may cause a visual representation of a notification indicating a rotor imbalance at the given wind turbine to be presented at a display of client station 106A. As another example, asset data platform 102 may cause an audible alert indicating a rotor imbalance at the given wind turbine to be rendered at a speaker of client station 106A.

In some implementations, the output may generically identify the existence of a rotor imbalance issue at the given wind turbine. In other implementations, the output may more specifically identify a particular type and/or cause of a rotor imbalance issue at the given wind turbine. Other examples are also possible.

In some cases, asset data platform 102 may be configured to perform various other functions as a result of executing the model for detecting rotor imbalance as well. For example, asset data platform 102 may cause a work order or the like to be generated (e.g., by sending one or more instructions to work-order system 106D), such as a rotor-repair work order. As another example, asset data platform 102 may cause one or more rotor parts to be ordered (e.g., by sending one or more instructions to parts-ordering system 106E). Other examples are also possible.

VI. CONCLUSION

Example embodiments of the disclosed process have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing system comprising:
   at least one processor;
   a non-transitory computer-readable medium; and
   program instructions stored on the non-transitory computer-readable medium that are executable by the at least one processor to cause the computing system to:
   obtain respective sets of historical vibration data for each of a plurality of wind turbines, wherein each respective set of historical vibration data comprises vibration data captured by a multi-dimensional sensor of a respective wind turbine;
   based on the respective sets of historical vibration data, derive a model for detecting rotor imbalance by:
   for each respective wind turbine of the plurality of wind turbines, (i) transforming each of a plurality of time segments of the respective wind turbine's set of historical vibration data into a respective frequency domain representation; and (ii) for each respective time segment of the plurality of time segments, using the respective frequency domain representation of the historical vibration data for the respective time segment to derive a respective set of harmonic mode values for at least one frequency range of interest within the respective frequency domain representation, wherein the respective sets of harmonic mode values for the plurality of time segments of the respective wind turbine's set of historical vibration data collectively comprise a respective time-series set of harmonic mode values for the respective wind turbine; and
   performing an evaluation of the respective time-series sets of harmonic mode values for the plurality of wind turbines and thereby deriving the model for detecting rotor imbalance;
   receive a given set of vibration data for a given wind turbine from a given reference time;
   based on the given set of vibration data, execute the derived model for detecting rotor imbalance and thereby detect a rotor imbalance at the given wind turbine; and
   after detecting the rotor imbalance at the given wind turbine, transmit, to an output device via a data network, a notification of the rotor imbalance at the given wind turbine.

2. The computing system of claim 1, wherein each respective set of historical vibration data comprises vibration data corresponding to (i) fore-to-aft movements of a respective wind turbine and (ii) side-to-side movements of the respective wind turbine.

3. The computing system of claim 1, further comprising program instructions that are executable by the at least one processor to cause the computing system to:
   before deriving the model for detecting rotor imbalance, filter the respective sets of historical vibration data based on respective historical data related to operation of each of the plurality of wind turbines that is indicative of a time when a respective wind turbine was likely operating abnormally for a reason other than rotor imbalance.

4. The computing system of claim 1, wherein the at least one frequency range of interest comprises a rotor frequency of a respective wind turbine.

5. The computing system of claim 1, wherein the program instructions that are executable by the at least one processor to cause the computing system to execute the derived model for detecting rotor imbalance comprise program instructions that are executable by the at least one processor to cause the computing system to:
   based on the given set of vibration data, derive one or more sets of harmonic mode values; and
   apply the derived model for detecting rotor imbalance to the one or more sets of harmonic mode values and thereby detect a rotor imbalance at the given wind turbine.

6. The computing system of claim 1, wherein performing an evaluation of the respective time-series sets of harmonic mode values for the plurality of wind turbines comprises applying one or more of a supervised machine learning technique or a rules-based technique to the respective time-series sets of harmonic mode values for the plurality of wind turbines and thereby deriving the model for detecting rotor imbalance.

7. The computing system of claim 1, wherein the program instructions that are executable by the at least one processor to cause the computing system to transmit the notification of the rotor imbalance at the given wind turbine comprise program instructions that are executable by the at least one processor to cause the computing system to:
   after detecting the rotor imbalance at the given wind turbine, cause, via the data network, the output device to display a visual indication of the rotor imbalance at the given wind turbine.

8. A method performed by a computing system, the method comprising:
   obtaining respective sets of historical vibration data for each of a plurality of wind turbines, wherein each respective set of historical vibration data comprises vibration data captured by a multi-dimensional sensor of a respective wind turbine;
   based on the respective sets of historical vibration data, deriving a model for detecting rotor imbalance by:
   for each respective wind turbine of the plurality of wind turbines, (i) transforming each of a plurality of time segments of the respective wind turbine's set of historical vibration data into a respective frequency domain representation; and (ii) for each respective time segment of the plurality of time segments, using the respective frequency domain representation of the historical vibration data for the respective time segment to derive a respective set of harmonic mode values for at least one frequency range of interest within the respective frequency domain representation, wherein the respective sets of harmonic mode values for the plurality of time segments of the respective wind turbine's set of historical vibration data collectively comprise a respective time-series set of harmonic mode values for the respective wind turbine; and
   performing an evaluation of the respective time-series sets of harmonic mode values for the plurality of wind turbines and thereby deriving the model for detecting rotor imbalance;
   receiving a given set of vibration data for a given wind turbine from a given reference time;
   based on the given set of vibration data, executing the derived model for detecting rotor imbalance and thereby detecting a rotor imbalance at the given wind turbine; and
   after detecting the rotor imbalance at the given wind turbine, transmitting, to an output device via a data network, a notification of the rotor imbalance at the given wind turbine.

9. The method of claim 8, wherein each respective set of historical vibration data comprises vibration data corresponding to (i) fore-to-aft movements of a respective wind turbine and (ii) side-to-side movements of the respective wind turbine.

10. The method of claim 8, further comprising:
before deriving the model for detecting rotor imbalance, filtering the respective sets of historical vibration data based on respective historical data related to operation of each of the plurality of wind turbines that is indicative of a time when a respective wind turbine was likely operating abnormally for a reason other than rotor imbalance.

11. The method of claim 8, wherein the at least one frequency range of interest comprises a rotor frequency of a respective wind turbine.

12. The method of claim 8, wherein executing the derived model for detecting rotor imbalance comprises:
based on the given set of vibration data, deriving one or more sets of harmonic mode values; and
applying the derived model for detecting rotor imbalance to the one or more sets of harmonic mode values and thereby detecting a rotor imbalance at the given wind turbine.

13. The method of claim 8, wherein performing an evaluation of the respective time-series sets of harmonic mode values for the plurality of wind turbines comprises applying one or more of a supervised machine learning technique or a rules-based technique to the respective time-series sets of harmonic mode values for the plurality of wind turbines and thereby deriving the model for detecting rotor imbalance.

14. The method of claim 8, wherein transmitting the notification of the rotor imbalance at the given wind turbine comprises:
after detecting the rotor imbalance at the given wind turbine, causing, via a data network, the output device to display a visual indication of the rotor imbalance at the given wind turbine.

15. A non-transitory computer-readable storage medium having program instructions stored thereon that are executable by at least one processor to cause a computing system to:
obtain respective sets of historical vibration data for each of a plurality of wind turbines, wherein each respective set of historical vibration data comprises vibration data captured by a multi-dimensional sensor of a respective wind turbine;
based on the respective sets of historical vibration data, derive a model for detecting rotor imbalance by:
for each respective wind turbine of the plurality of wind turbines, (i) transforming each of a plurality of time segments of the respective wind turbine's set of historical vibration data into a respective frequency domain representation; and (ii) for each respective time segment of the plurality of time segments, using the respective frequency domain representation of the historical vibration data for the respective time segment to derive a respective set of harmonic mode values for at least one frequency range of interest within the respective frequency domain representation, wherein the respective sets of harmonic mode values for the plurality of time segments of the respective wind turbine's set of historical vibration data collectively comprise a respective time-series set of harmonic mode values for the respective wind turbine; and
performing an evaluation of the respective time-series sets of harmonic mode values for the plurality of wind turbines and thereby deriving the model for detecting rotor imbalance;
receive a given set of vibration data for a given wind turbine from a given reference time;
based on the given set of vibration data, execute the derived model for detecting rotor imbalance and thereby detect a rotor imbalance at the given wind turbine; and
after detecting the rotor imbalance at the given wind turbine, transmit, to an output device via a data network, a notification of the rotor imbalance at the given wind turbine.

16. The computer-readable medium of claim 15, wherein each respective set of historical vibration data comprises vibration data corresponding to (i) fore-to-aft movements of a respective wind turbine and (ii) side-to-side movements of the respective wind turbine.

17. The computer-readable medium of claim 15, further comprising program instructions that are executable by the at least one processor to cause the computing system to:
before deriving the model for detecting rotor imbalance, filter the respective sets of historical vibration data based on respective historical data related to operation of each of the plurality of wind turbines that is indicative of a time when a respective wind turbine was likely operating abnormally for a reason other than rotor imbalance.

18. The computer-readable medium of claim 15, wherein the at least one frequency range of interest comprises a rotor frequency of a respective wind turbine.

19. The computer-readable medium of claim 15, wherein the program instructions that are executable by the at least one processor to cause the computing system to execute the derived model for detecting rotor imbalance comprise program instructions that are executable by the at least one processor to cause the computing system to:
based on the given set of vibration data, derive one or more sets of harmonic mode values; and
apply the derived model for detecting rotor imbalance to the one or more sets of harmonic mode values and thereby detect a rotor imbalance at the given wind turbine.

20. The computer-readable medium of claim 15, wherein the program instructions that are executable by the at least one processor to cause the computing system to transmit the notification of the rotor imbalance at the given wind turbine comprise program instructions that are executable by the at least one processor to cause the computing system to:
after detecting the rotor imbalance at the given wind turbine, cause, via the data network, the output device to display a visual indication of the rotor imbalance at the given wind turbine.

* * * * *